United States Patent
Won et al.

(10) Patent No.: US 11,553,275 B2
(45) Date of Patent: Jan. 10, 2023

(54) METHOD OF PROVIDING SOUND THAT MATCHES DISPLAYED IMAGE AND DISPLAY DEVICE USING THE METHOD

(71) Applicant: Samsung Display Co., LTD., Yongin-si (KR)

(72) Inventors: Byeong Hee Won, Incheon (KR); Jin Oh Kwag, Suwon-si (KR); Sung Chan Jo, Seoul (KR); Yi Joon Ahn, Seoul (KR); Jae Been Lee, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 672 days.

(21) Appl. No.: 16/678,644

(22) Filed: Nov. 8, 2019

(65) Prior Publication Data

US 2020/0213737 A1 Jul. 2, 2020

(30) Foreign Application Priority Data

Dec. 28, 2018 (KR) .................... 10-2018-0173035
Feb. 12, 2019 (KR) .................... 10-2019-0016042

(51) Int. Cl.
*H04R 5/04* (2006.01)
*H04N 5/04* (2006.01)
*H04N 9/802* (2006.01)
*H04S 7/00* (2006.01)
*H04R 7/04* (2006.01)
*H04R 1/02* (2006.01)

(52) U.S. Cl.
CPC ............... *H04R 5/04* (2013.01); *H04N 5/04* (2013.01); *H04N 9/802* (2013.01); *H04R 1/028* (2013.01); *H04R 7/045* (2013.01); *H04S 7/303* (2013.01); *H04R 2201/401* (2013.01); *H04R 2440/05* (2013.01); *H04R 2499/11* (2013.01); *H04R 2499/15* (2013.01); *H04S 2400/11* (2013.01)

(58) Field of Classification Search
CPC .......... H04R 1/028; H04R 7/045; H04R 3/12; H04R 5/02; H04R 5/04; H04R 2201/401; H04R 2440/05; H04R 2499/15; H04R 2499/11; H04S 2400/11; H04N 5/04; H04N 5/60; H04N 5/642; H04N 9/802
See application file for complete search history.

(56) References Cited

U.S. PATENT DOCUMENTS

2016/0065791 A1* 3/2016 Li .................... H04S 7/30 348/515
2020/0389734 A1* 12/2020 Won .................. H04R 5/02
2020/0401777 A1* 12/2020 Won .................. H04R 1/028

FOREIGN PATENT DOCUMENTS

KR 1020160119218 10/2016
KR 1020180134647 12/2018

* cited by examiner

*Primary Examiner* — Huyen D Le
(74) *Attorney, Agent, or Firm* — Cantor Colburn LLP

(57) ABSTRACT

A method of providing sounds matching an image displayed on a display panel includes: calculating a first object in the image by analyzing digital video data corresponding to the image, and calculating first gain values based on a location of the first object, and applying first gain values to a plurality of sound data; displaying the image on the display panel based on the digital video data; and outputting the plurality of sounds by vibrating the display panel based on the plurality of sound data to which the first gain values applied, using a plurality of sound generating devices.

26 Claims, 31 Drawing Sheets

↑ POLARIZATION DIRECTION

FIG. 10A

| PC = (x, y)   | GA | GB | GC | GD |
|---------------|----|----|----|----|
| (1, 1)        | a  | b  | c  | d  |
| (2, 1)        | e  | f  | g  | h  |
| (3, 1)        | i  | j  | k  | l  |
| (4, 1)        | m  | n  | o  | p  |
| (5, 1)        | q  | r  | s  | t  |
| ⋮             | ⋮  | ⋮  | ⋮  | ⋮  |
| (3840, 2160)  | w  | x  | y  | z  |

FIG. 10B

| PC = (x, y) | GA | GB | GC | GD |
|---|---|---|---|---|
| (1, 1) | aa | bb | cc | dd |
| (2, 1) | ee | ff | gg | hh |
| (3, 1) | ii | jj | kk | ll |
| (4, 1) | mm | nn | oo | pp |
| (5, 1) | qq | rr | ss | tt |
| ⋮ | ⋮ | ⋮ | ⋮ | ⋮ |
| (3840, 2160) | ww | xx | yy | zz |

METHOD OF PROVIDING SOUND THAT MATCHES DISPLAYED IMAGE AND DISPLAY DEVICE USING THE METHOD

This application claims priority to Korean Patent Application No. 10-2018-0173035 filed on Dec. 28, 2018 and No. 10-2019-0016042 filed on Feb. 12, 2019, and all the benefits accruing therefrom under 35 U.S.C. § 119, the content of which in its entirety is herein incorporated by reference.

BACKGROUND

1. Field

The disclosure relates to a method of providing sound that matches a displayed image and a display device using the method.

2. Description of the Related Art

As information technology develops, the demand for display devices for displaying images has increased and diversified. A display device has been applied to a variety of electronic devices such as a smart phone, a digital camera, a notebook computer, a navigation device, a smart television ("TV") or the like, for example. Such a display device may include a flat panel display device such as a liquid crystal display ("LCD") device, a field emission display ("FED") device, an organic light-emitting diode ("OLED") display device or the like, for example.

A display device may include a display panel for displaying an image and a sound generating device for providing sound. The display device may be a flat panel display device such as an LCD device, an FED device, an OLED display device, or the like. In such a display device, the sound generating device may be a speaker. Recently, attention has been focused not only on a display device capable of displaying a high-quality, high-resolution image, but also on a display device capable of outputting realistic sound.

SUMMARY

Embodiments of the disclosure provide a method of providing realistic sound that matches a displayed image by outputting sound in accordance with changes in the location of an object in the displayed image.

Embodiments of the disclosure also provide a display device in which the range of driving voltages of the driving transistors of pixels is widened.

According to an embodiment of the disclosure, a method of providing a plurality of sounds matching an image displayed on a display panel includes: calculating a first object in the image by analyzing digital video data corresponding to the image, and calculating first gain values based on a location of the first object, and applying first gain values to a plurality of sound data; displaying the displayed image on the display panel based on the digital video data; and outputting the plurality of sounds by vibrating the display panel based on the plurality of sound data to which the first gain values applied, using a plurality of sound generating devices.

According to an embodiment of the disclosure, a display device includes: a display panel including first and second substrates; a plurality of sound generating devices disposed on a first surface of the first substrate, where the plurality of sound generating devices vibrates the display panel to output a sound; a data driving unit which generates data voltages based on digital video data corresponding to an image to be displayed on the display panel and outputs the data voltages to data lines of the display panel; an image-sound matching unit which calculates a first object in the image by analyzing the digital video data, and applies first gain values, which are calculated based on a location of the first object, to a plurality of sound data; and a sound driving unit which converts the plurality of sound data into a plurality of sound signals and outputs the plurality of sound signals to the plurality of sound generating devices, respectively.

According to embodiments of the disclosure, sound generated by each sound generating device may be adjusted based on a change in the location of an object in a displayed image by applying gain values calculated based on the location of the object to sound data. Since sound generated by each sound generating device may be controlled based on the distance between the object and each sound generating device, a user may feel as if sound were output from the object. Accordingly, the user may be provided with realistic sound that matches the displayed image.

In an embodiment, a first sound data, which is sound data corresponding to a first object in a displayed image, and a second sound data, which is sound data corresponding to a second object in the displayed image, are received, and first gain values corresponding to the location of the first object and second gain values corresponding to the location of the second object are applied to the first sound data and the second sound data, respectively. In such an embodiment, sound corresponding to the first object and sound corresponding to the second object may be provided in connection with the displayed image. Accordingly, the user may be provided with realistic sound that matches the displayed image.

BRIEF DESCRIPTION OF THE DRAWINGS

The above and other embodiments and features of the disclosure will become more apparent by describing in detail embodiments thereof with reference to the attached drawings, in which:

FIG. 10A shows an exemplary first lookup table in which first through fourth gain values corresponding to each pair of pixel coordinates when a user's viewing distance is a first viewing distance are stored;

FIG. 10B shows an exemplary second lookup table in which first through fourth gain values corresponding to each pair of pixel coordinates when the user's viewing distance is a second viewing distance;

DETAILED DESCRIPTION

Figure 1:
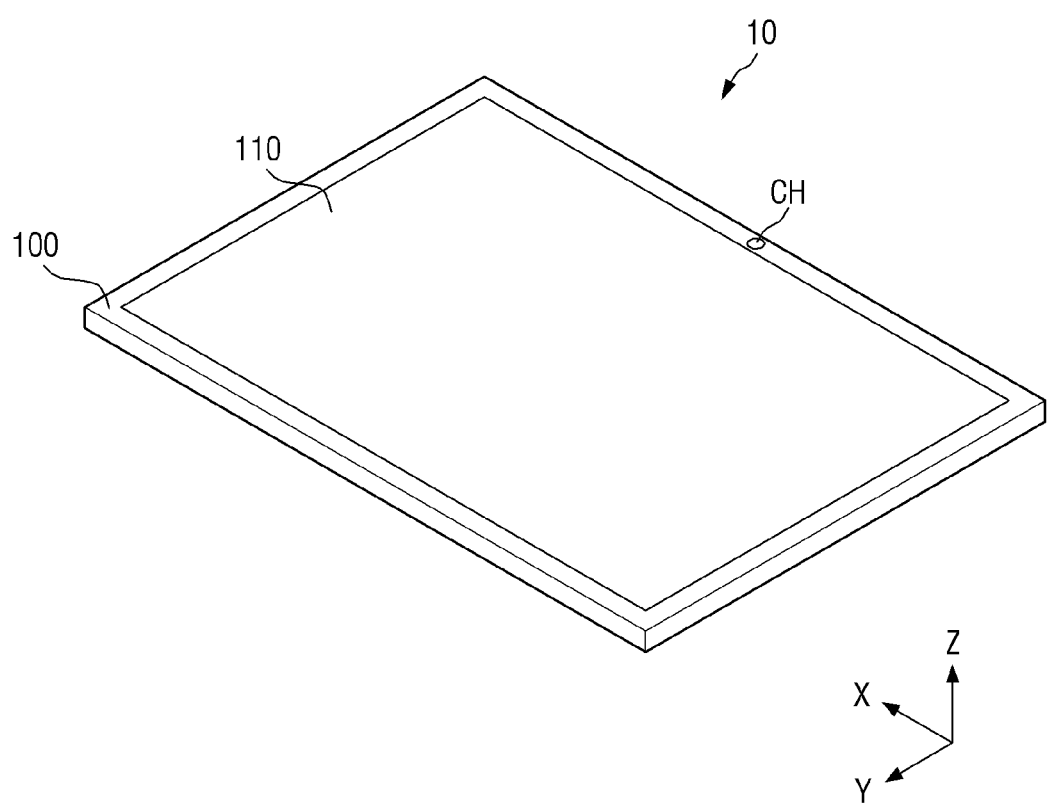
FIG. 1 is a perspective view of a display device according to an embodiment of the disclosure.

The invention will now be described more fully hereinafter with reference to the accompanying drawings, in which preferred embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

It will also be understood that when a layer is referred to as being "on" another layer or substrate, it can be directly on the other layer or substrate, or intervening layers may also be present. In contrast, when an element is referred to as being "directly on" another element, there are no intervening elements present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." "At least one of A and B" means "A and/or B." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be described with reference to the accompanying drawings.

Figure 2:
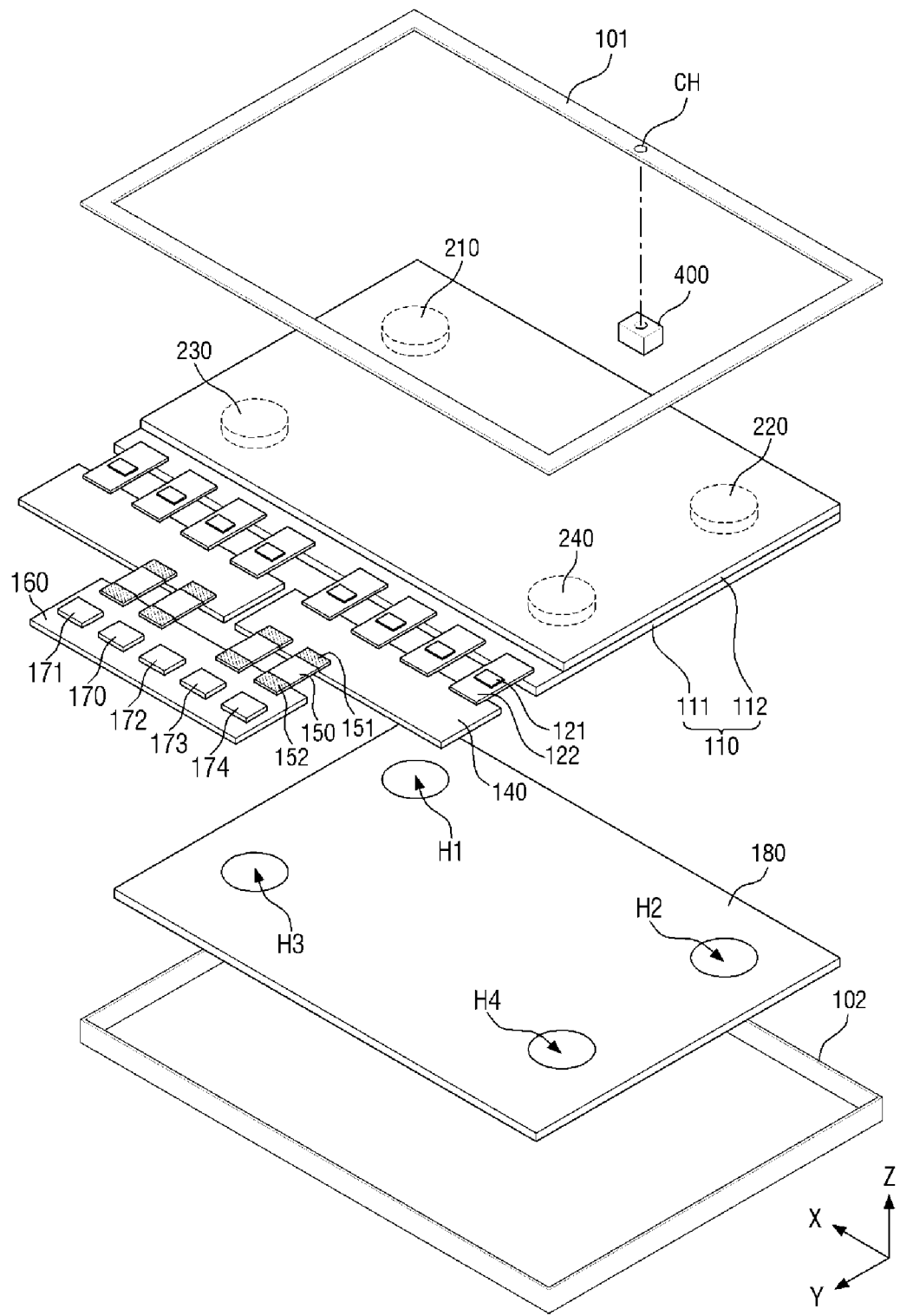
FIG. 2 is an exploded perspective view of the display device of FIG. 1.
Figure 3:
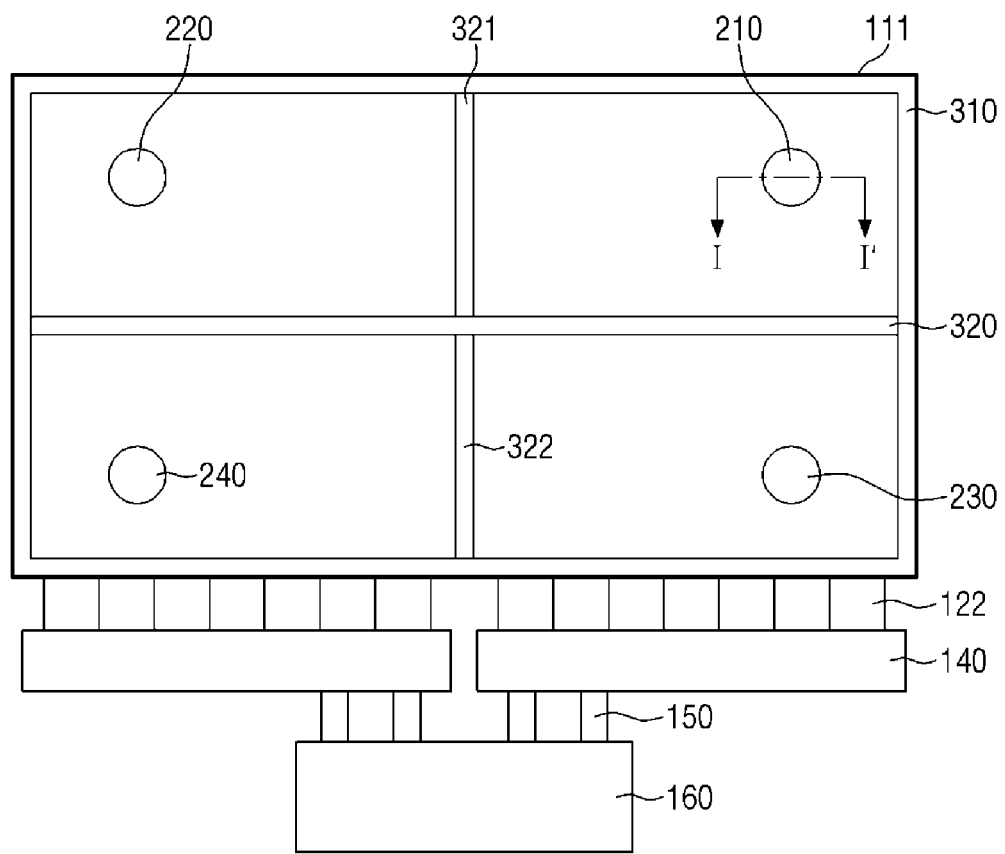
FIG. 3 is a bottom view illustrating an exemplary embodiment of the display panel of FIG. 2.
Figure 3:
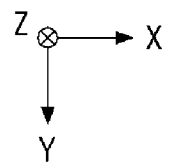

FIG. 1 is a perspective view of a display device according to an embodiment of the disclosure. FIG. 2 is an exploded perspective view of the display device of FIG. 1. FIG. 3 is a bottom view illustrating an exemplary embodiment of the display panel of FIG. 2.

Referring to FIGS. 1 through 3, an embodiment of a display device 10 includes a set cover 100, a display panel 110, source drivers 121, flexible films 122, source circuit boards 140, cables 150, a control circuit board 160, a timing control unit 170, an image-sound matching unit 171, a memory 172, lookup tables 173, a lower cover 180, first, second, third and fourth sound generating devices 210, 220, 230 and 240, first, second and third radio wave blocking members 310, 320 and 321, and a camera device 400.

The terms "above", "top", and "top surface", as used herein, denote a direction in which a second substrate 112 of the display panel 110 is disposed with respect to a first substrate 111 of the display panel 110, i.e., a thickness direction of the display panel 110 or a Z-axis direction, and the terms "below", "bottom", and "bottom surface", as used herein, denote a direction in which the lower cover 180 is disposed with respect to the first substrate of the display panel 110, i.e., the opposite direction of the Z-axis direction. Also, the terms "left", "right", "upper", and "lower", as used herein, denote their respective directions as viewed from the display panel 110 in FIG. 2. For example, the term "left" denotes an X-axis direction, the term "right" denotes the opposite direction of the X-axis direction, the term "upper"

denotes a Y-axis direction, and the term "lower" denotes the opposite direction of the Y-axis direction.

The set cover 100 may be disposed to cover the edges of the display panel 110. The set cover 100 may cover a non-display area of the display panel 110, but expose a display area of the display panel 110. In an embodiment, as illustrated in FIG. 2, the set cover 100 may include upper and lower set covers 101 and 102. The upper set cover 101 may cover the edges of the top surface of the display panel 110, and the lower set cover 102 may cover the bottom surface and the side surfaces of the display panel 110. The upper and lower set covers 101 and 102 may be coupled to each other via a fixing member. The upper and lower set covers 101 and 102 may include or be formed of plastic, a metal or a combination thereof.

A camera hole CH for exposing the camera device 400 may be defined or formed on the top surface of the upper set cover 101. FIG. 2 illustrates an embodiment where the camera hole CH is defined or formed in a upper portion of the upper set cover 101, but the disclosure is not limited thereto. Alternatively, the camera hole CH may be defined or formed in a left side portion or a right side portion of the upper set cover 101 or in a lower portion of the upper set cover 101.

The display panel 110 may have a rectangular shape when viewed from a top plan view. In one embodiment, for example, the display panel 110 may have a rectangular shape having long sides extending in a first direction (or the X-axis direction) and short sides extending in a second direction (or the Y-axis direction) when viewed from a top plan view. The corners where the long sides and the short sides meet may be right-angled or rounded. The planar shape of the display panel 110 is not particularly limited, and the display panel 110 may be in one of various other shapes such as a polygonal shape other than a rectangular shape, a circular shape, or an elliptical shape.

FIG. 2 illustrates an embodiment where the display panel 110 is flat, but the disclosure is not limited thereto. Alternatively, the display panel 110 may be in a bent state with a predetermined curvature.

The display panel 110 may include the first and second substrates 111 and 112. The first and second substrates 111 and 112 may be rigid or flexible. The first substrate 111 may include or be formed of glass or plastic. The second substrate 112 may include or be formed of a glass, a plastic, an encapsulation film, or a barrier film. In one embodiment, for example, each of the first and second substrates 111 and 112 may include a plastic such as polyethersulphone ("PES"), polyacrylate ("PA"), polyarylate ("PAR"), polyetherimide ("PEI"), polyethylene naphthalate ("PEN"), polyethylene terephthalate ("PET"), polyphenylene sulfide ("PPS"), polyallylate, polyimide ("PI"), polycarbonate ("PC"), cellulose triacetate ("CAT"), cellulose acetate propionate ("CAP"), or a combination thereof. In one embodiment, for example, each of the first and second substrates 111 and 112 may include an encapsulation film or a barrier film in which a plurality of inorganic films are stacked.

Figure 11:
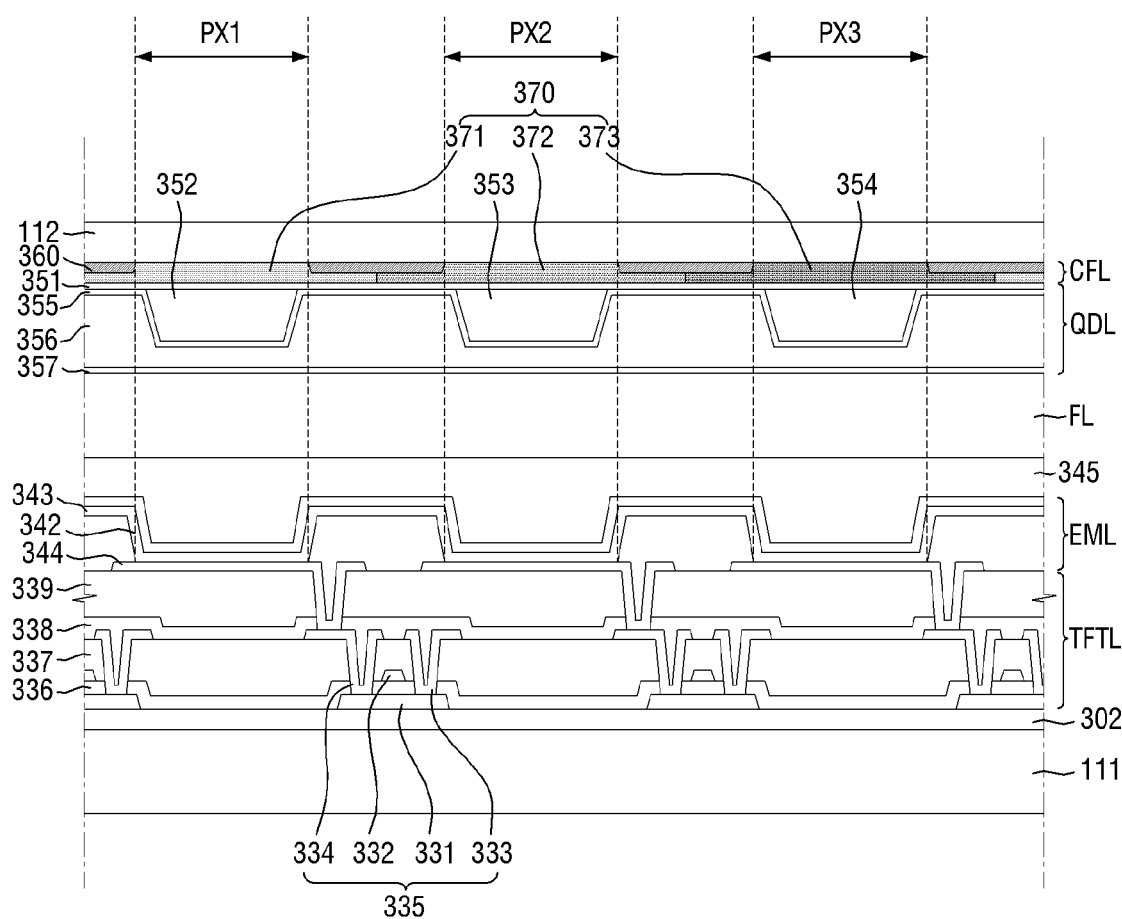
FIG. 11 is a cross-sectional view illustrating an exemplary embodiment of pixels of the display panel of FIG. 9.

In an embodiment, the display panel 110 may include a thin-film transistor ("TFT") layer TFTL, a light-emitting element layer EML, a filler member FL, a light wavelength conversion layer QDL, and a color filter layer CFL, as illustrated in FIG. 11. In such an embodiment, the first substrate 111 may be a TFT substrate on which the TFT layer TFTL, the light-emitting element layer EML, and the encapsulation film 345 are disposed, the second substrate 112 may be a color filter substrate on which the light wavelength conversion layer QDL and the color filter layer CFL are disposed, and the filler member FL may be disposed between an encapsulation film 345 on the first substrate 111 and the light wavelength conversion layer QDL on the second substrate 112. The TFT layer TFTL, the light-emitting element layer EML, the filler member, FL, the light wavelength conversion layer QDL, and the color filter layer CFL of the display panel 110 will be described later in greater detail with reference to FIG. 11.

First sides of the flexible films 122 may be attached onto the first substrate 111 of the display panel 110, and second sides of the flexible films 122 may be attached onto the source circuit boards 140. In an embodiment, where the first substrate 111 has a larger size than the second substrate 112, one side of the first substrate 111 may not be covered by the second substrate 112, but may be exposed. In such an embodiment, the flexible films 122 may be attached to a part of the first substrate 111 that is not covered by the second substrate 112. The flexible films 122 may be attached onto a first surface of the first substrate 111 and on first surfaces of the source circuit boards 140 using anisotropic conductive films. The first surface of the first substrate 111 may be a surface of the first substrate 111 that is opposite to the surface of the first substrate 111 that faces the second substrate 112.

The flexible films 122 may be in a form of a tape carrier package or a chip-on-film. The flexible films 122 may be bendable. Accordingly, the flexible films 122 may be bent toward the bottom of the first substrate 111, such that the source circuit boards 140, the cables 150, and the control circuit board 160 may be disposed on the first surface of the first substrate 111.

FIG. 2 illustrates an embodiment where eight flexible films 122 are attached onto the first substrate 111 of the display panel 110, but the number of flexible films 122 provided is not particularly limited.

The source drivers 121 may be disposed on the flexible films 122. The source drivers 121 may be formed as integrated circuits ("IC"s). The source drivers 121 may convert digital video data into analog data voltages based on a source control signal from the timing control unit 170 and may provide the analog data voltages to the data lines of the display panel 110 via the flexible films 122.

In an embodiment, the source circuit boards 140 may be connected to the control circuit board 150 via the cables 150. In such an embodiment, the source circuit boards 140 may include first connectors 151 for connecting the source circuit boards 140 to the cables 150. The source circuit boards 140 may be printed circuit boards ("PCB"s) or flexible PCBs ("FPCB"s). The cables 150 may be flexible cables.

In an embodiment, the control circuit board 160 may be connected to the source circuit boards 140 via the cables 150. In such an embodiment, the control circuit board 160 may include second connectors 152 for connecting the control circuit board 160 to the cables 150. The control circuit board 160 may be a PCB or an FPCB.

FIG. 2 illustrates an embodiment where four cables 150 are provided to connect the source circuit boards 140 and the control circuit board 160, but the number of cables 150 provided is not particularly limited. Also, FIG. 2 illustrates an embodiment where two source circuit boards 140 are provided, but the number of source circuit boards 140 provided is not particularly limited.

The timing control unit 170, the image-sound matching unit 171, the memory 172, and the lookup tables 173 may be disposed on the control circuit board 160.

The timing control unit 170 may be formed as an IC. The timing control unit 170 may receive digital video data from the memory 172. The timing control unit 170 may generate a source control signal for controlling the timings of the source drivers 121. The timing control unit 170 may output the received digital video data and the source control signal to the source drivers 121.

A system-on-chip may be disposed or mounted on a system circuit board that is connected to the control circuit board 160 via a flexible cable and may be formed as an IC. The system-on-chip may be a processor of a smart television ("TV"), a central processing unit ("CPU)" or a graphics card of a computer or a laptop computer, or an application processor of a smartphone or a tablet personal computer ("PC"). The system circuit board may be a PCB or a FPCB.

In an embodiment, the image-sound matching unit 171 receives digital video data from the memory 172. In such an embodiment, the image-sound matching unit 171 receives a plurality of sound data from the system-on-chip. The image-sound matching unit 171 may calculate a first object in an image corresponding to the received digital video data by analyzing the received digital video data. The image-sound matching unit 171 may calculate first gain values based on the location of the first object and may apply first gain values to the plurality of sound data. In one embodiment, for example, the image-sound matching unit 171 may receive first gain values corresponding to the pixel coordinate of the first object, which represent the location of the first object, from the lookup tables 173. The image-sound matching unit 171 outputs a plurality of sound data to which the first gain values are applied to a sound driving unit 174.

The plurality of sound data may include first, second, third and fourth sound data for driving the first, second, third and fourth sound generating devices 210, 220, 230 and 240, respectively. The first gain values may be values for adjusting the sound generated by the first, second, third and fourth sound generating devices 210, 220, 230 and 240 based on the distances between the first object and the first sound generating device 210, between the first object and the second sound generating device 220, between the first object and the third sound generating device 230, and between the first object and the fourth sound generating device 240. The combination of first, second, third and fourth sound output based on the first, second, third and fourth sound data with the first gain values applied thereto may be heard by a user as if it were output from the first object. The first gain values will be described later in detail with reference to FIGS. 9, 10, and 12 through 16.

The image-sound matching unit 171 may apply the first gain values calculated based on the location of the first object to the first, second, third and fourth sound data, thereby adjusting the first, second, third and fourth sound generated by the first, second, third and fourth sound generating devices 210, 220, 230 and 240, respectively, based on a change in the location of the first object. In an embodiment, the image-sound matching unit 171 controls the sound generated by each of the first, second, third and fourth sound generating devices 210, 220, 230 and 240 based on the distance between the first object and each of the first, second, third and fourth sound generating devices 210, 220, 230 and 240, such that the user may feel as if sound were output from the first object. Accordingly, the user may be provided with realistic sound in connection with a displayed image. It will be described later with reference to FIGS. 11 and 12 how the image-sound matching unit 171 provides sound that matches a displayed image.

The memory 172 receives digital video data from the system-on-chip. The memory 172 may store digital video data corresponding to X frame periods (where X is an integer of 2 or greater). In one embodiment, for example, the memory 172 may store digital video data of an image to be displayed by the display panel 110 for a period of several seconds. The memory 172 may be a volatile memory such as a register, a static random access memory ("SRAM"), or a dynamic random access memory ("DRAM"). The memory 172 outputs the received digital video data to the timing control unit 170 and the image-sound matching unit 171.

The lookup tables 173 may be memories in which gain values corresponding to each pair of pixel coordinates on the display panel 110 are stored. The lookup tables 173 may receive the pixel coordinate of the first object, which represent the location of the first object, and may output the first gain values corresponding to the pixel coordinate of the first object. The lookup tables 173 may be nonvolatile memories such as electrically erasable programmable read-only memories ("EEPROM"s) or flash memories.

The sound driving unit 174 may receive the plurality of sound data from the image-sound matching unit 171. The sound driving unit 174 may be formed as an IC and may be disposed on the control circuit board 160. The sound driving unit 174 may include as digital signal processor ("DSP") for processing the plurality of sound data, which are digital signals, a digital-to-analog converter ("DAC") for converting the digital signals processed by the DSP into driving voltages, which are analog signals, and an amplifier ("AMP") for amplifying and outputting the analog driving voltages obtained by the DAC.

The plurality of sound data may include the first, second, third and fourth data. In this case, the sound driving unit 174 may generate a first sound signal including 1A and 1B driving voltages for driving the first sound generating device 210 based on the first sound data, may generate a second sound signal including 2A and 2B driving voltages for driving the second sound generating device 220 based on the second sound data, may generate a third sound signal including 3A and 3B driving voltages for driving the third sound generating device 230 based on the third sound data, and may generate a fourth sound signal including driving voltages 4A and 4B for driving the fourth sound generating device 240 based on the fourth sound data.

A power supply circuit may be additionally attached onto the control circuit board 160. The power supply circuit may generate voltages used for driving the display panel 110 based on main power applied from the system circuit board and may supply the generated voltages to the display panel 110. In one embodiment, for example, the power supply circuit may generate a high-potential voltage, a low-potential voltage, and an initialization voltage for driving OLEDs and may supply the high-potential voltage, the low-potential voltage, and the initialization voltage to the display panel 110. In such an embodiment, the power supply circuit may generate and supply driving voltages for driving the source drivers 121 and the timing control unit 170. The power supply circuit may be formed as an IC. Alternatively, the power supply circuit may be disposed on a power circuit board, which is a separate element from the control circuit board 160. The power circuit board may be a PCB or an FPCB.

The lower cover 180 may be disposed on the first surface of the first substrate 111 that faces the second substrate 112. The lower cover 180 may be attached onto an edge on the first surface of the first substrate 111 of the display panel 110 via an adhesive member. The adhesive member may be a double-sided tape including a buffer layer such as a foam. The lower cover 180 may include a metal or a tempered glass.

First, second, third and fourth holes H1, H2, H3, and H4 may be defined or formed in the lower cover 180. The first, second, third and fourth holes H1, H2, H3, and H4 may overlap the first, second, third and fourth sound generating devices 210, 220, 230 and 240, respectively, in a third direction (or the Z-axis direction). In an embodiment, the height of the first, second, third and fourth sound generating devices 210, 220, 230 and 240 is greater than the distance between the first substrate 111 and the lower cover 180, such that the first, second, third and fourth sound generating devices 210, 220, 230 and 240 may be disposed in the first, second, third and fourth holes H1, H2, H3, and H4, which are defined or formed in the lower cover 180. In one embodiment, for example, the first sound generating device 210 may be disposed in the first hole H1, the second sound generating device 220 may be disposed in the second hole H2, the third sound generating device 230 may be disposed in the third hole H3, and the fourth sound generating device 240 may be disposed in the fourth hole H4.

In an embodiment, a heat dissipation film (not shown) may be disposed between the first surface of the first substrate 111 and the lower cover 180. In such an embodiment, the first, second, third and fourth sound generating devices 210, 220, 230 and 240 may be disposed on the heat dissipation film. The heat dissipation film dissipates heat generated by the first, second, third and fourth sound generating devices 210, 220, 230 and 240. In such an embodiment, the heat dissipation film may include a metal layer including or formed of a material having a high thermal conductivity such as graphite, silver (Ag), copper (Cu), or aluminum (Al). Alternatively, the heat dissipation film may be omitted.

In an embodiment, the first, second, third and fourth sound generating devices 210, 220, 230 and 240 may be vibration devices capable of vibrating the display panel 110 in the third direction (or the Z-axis direction). In such an embodiment, the display panel 110 may serve as a diaphragm for outputting sound.

The first, second, third and fourth sound generating devices 210, 220, 230 and 240 may be disposed on the first surface of the first substrate 111. The first sound generating device 210 may be disposed closer than the second, third and fourth sound generating devices 220, 230 and 240 to a first corner of the first substrate 111. The first corner of the first substrate 111 may be the upper left corner of the first substrate 111. The second sound generating device 220 may be disposed closer than the first, third and fourth sound generating devices 210, 230 and 240 to a second corner of the first substrate 111. The second corner of the first substrate 111 may be the upper right corner of the first substrate 111. The third sound generating device 230 may be disposed closer than the first, second and fourth sound generating devices 210, 220 and 240 to a third corner of the first substrate 111. The third corner of the first substrate 111 may be the lower left corner of the first substrate 111. The fourth sound generating device 240 may be disposed closer than the first, second and third sound generating devices 210, 220 and 230 to a fourth corner of the first substrate 111. The fourth corner of the first substrate 111 may be the lower right corner of the first substrate 111.

The first, second, third and fourth sound generating devices 210, 220, 230 and 240 may be in a circular or elliptical shape when viewed from a plan view, as illustrated in FIGS. 2 and 3, or may be in a rectangular shape when viewed from a plan view, but the disclosure is not limited thereto. Alternatively, the first, second, third and fourth sound generating devices 210, 220, 230, and 240 may be in a polygonal shape other than a rectangular shape when viewed from a plan view.

Each of the first, second, third and fourth sound generating devices 210, 220, 230 and 240 may be electrically connected to the sound driving unit 174 via a sound circuit board. The sound circuit board may be an FPCB.

In an embodiment, as shown in FIG. 3, the first radio wave blocking member 310 may be disposed along the edges of the first substrate 111. The second radio wave blocking member 320 may be disposed along the first direction (or the X-axis direction) and may divide the first surface of the first substrate 111 into upper and lower areas. The third radio wave blocking member 321 may be disposed along the second direction (or the Y-axis direction) and may be in contact with the first and second radio wave blocking members 310 and 320 on both sides thereof. The upper area of the first surface of the first substrate 111 may be divided into first and second areas A1 and A2 by the third radio wave blocking member 321. The fourth radio wave blocking member 322 may be disposed along the second direction (or the Y-axis direction) and may be in contact with the first and second radio wave blocking members 310 and 320 on both sides thereof. The lower area of the first surface of the first substrate 111 may be divided into third and fourth areas A3 and A4 by the fourth radio wave blocking member 322. That is, the first surface of the first substrate 111 may be divided into the first, second, third and fourth areas A1, A2, A3 and A4 by the first, second, third and fourth radio wave blocking members 310, 320, 321 and 322.

The first, second, third and fourth sound generating devices 210, 220, 230 and 240 may be disposed in the first, second, third and fourth areas A1, A2, A3 and A4. In one embodiment, for example, the first sound generating device 210 may be disposed in the first area A1, the second sound generating device 220 may be disposed in the second area A2, the third sound generating device 230 may be disposed in the third area A3, and the fourth sound generating device 240 may be disposed in the fourth area A4. Accordingly, in such an embodiment, vibration generated by the first sound generating device 210 may be blocked by the second and third radio wave blocking members 320 and 321, such that the influence of the vibration generated by the first sound generating device 210 on the second, third and fourth areas A2, A3, and A4 may be effectively prevented or substantially alleviated. In such an embodiment, vibration generated by the second sound generating device 220 may be blocked by the second and third radio wave blocking members 320 and 321, such that the influence of the vibration generated by the second sound generating device 220 on the first, third, and fourth areas A1, A3, and A4 can be prevented or at least alleviated. In such an embodiment, vibration generated by the third sound generating device 230 may be blocked by the second and fourth radio wave blocking members 320 and 322, such that the influence of the vibration generated by the third sound generating device 220 on the first, second and fourth areas A1, A2, and A4 may be effectively prevented or substantially alleviated. In such an embodiment, vibration generated by the fourth sound generating device 240 may be blocked by the second and fourth radio wave blocking members 320 and 322, such that the influence of the vibration generated by the fourth sound generating device 240 on the first, second and third areas A1, A2, and A3 may be effectively prevented or substantially alleviated.

Figure 4:
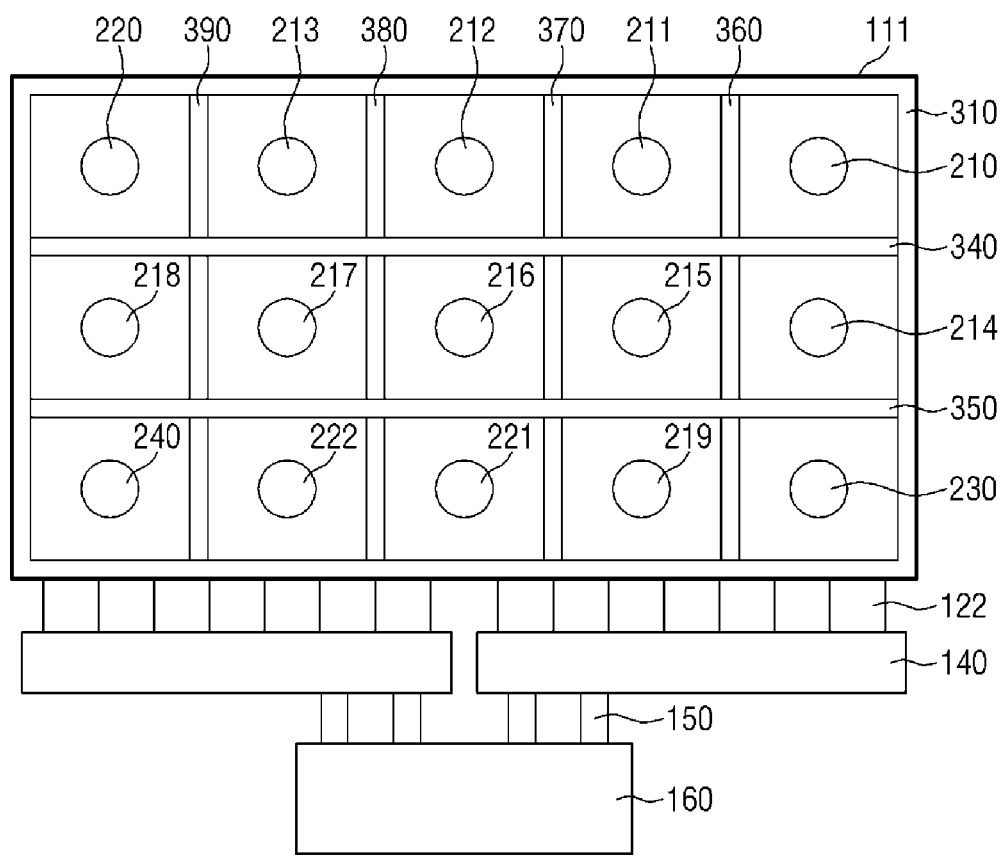
FIG. 4 is a bottom view illustrating an alternative exemplary of the display panel of FIG. 2.

FIGS. 2 and 3 illustrate an embodiment where the display device 10 includes four sound generating devices, but the number of sound generating devices included in the display device 10 is not particularly limited. In one alternative embodiment, for example, the display device 10 may include fifteen sound generating devices (210, 211, 212, 213, 214, 215, 216, 217, 218, 219, 220, 221, 222, 230 and 240), as illustrated in FIG. 4. In such an embodiment, the first surface of the first substrate 111 may be divided into fifteen areas by seven radio wave blocking members (310, 340, 350, 360, 370, 380 and 390), and the fifteen sound generating devices (210, 211, 212, 213, 214, 215, 216, 217, 218, 219, 220, 221, 222, 230, and 240) may be disposed in the fifteen areas (A1 through A15), respectively. The display device 10 may include at least two sound generating devices, and the larger the display panel 110 is, the greater the number of sound generating devices included in the display device 10 may become.

Figure 5:
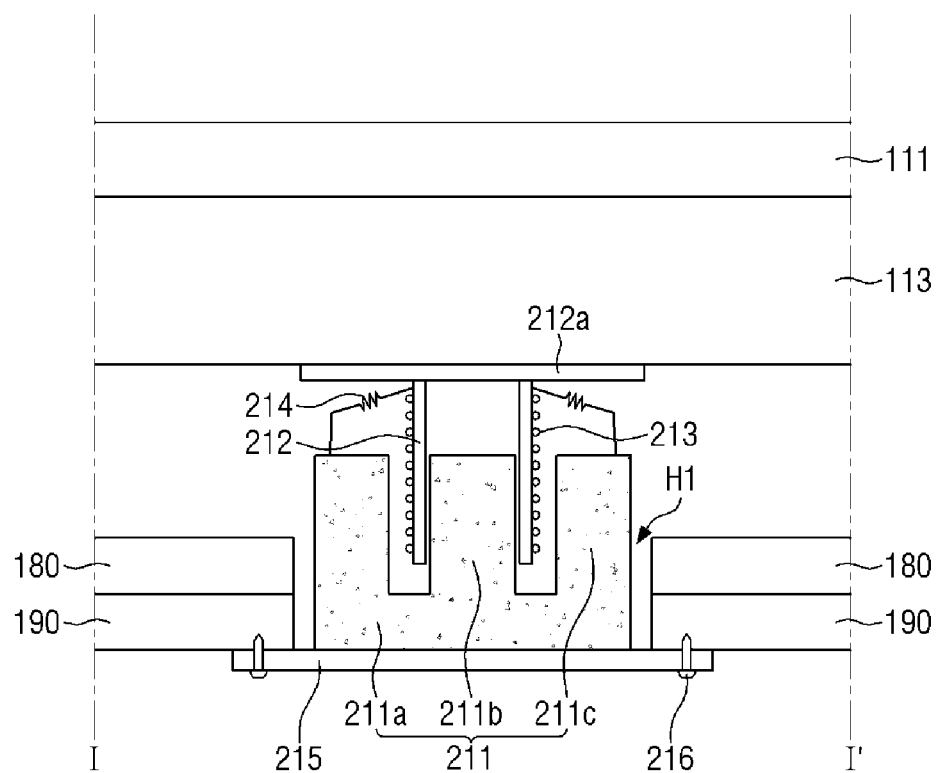
FIG. 5 is a cross-sectional view illustrating an exemplary embodiment of a first sound generating device of FIG. 3.
Figure 6A:
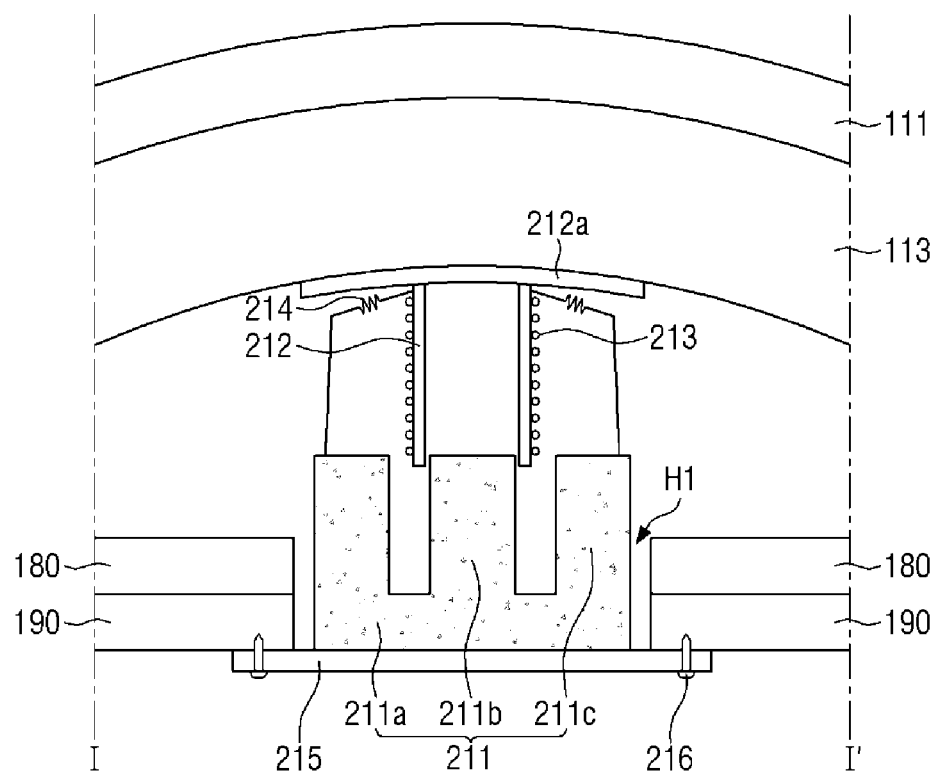
FIGS. 6A and 6B are cross-sectional views illustrating how a display panel is vibrated by the first sound generating device of FIG. 5.
Figure 6B:
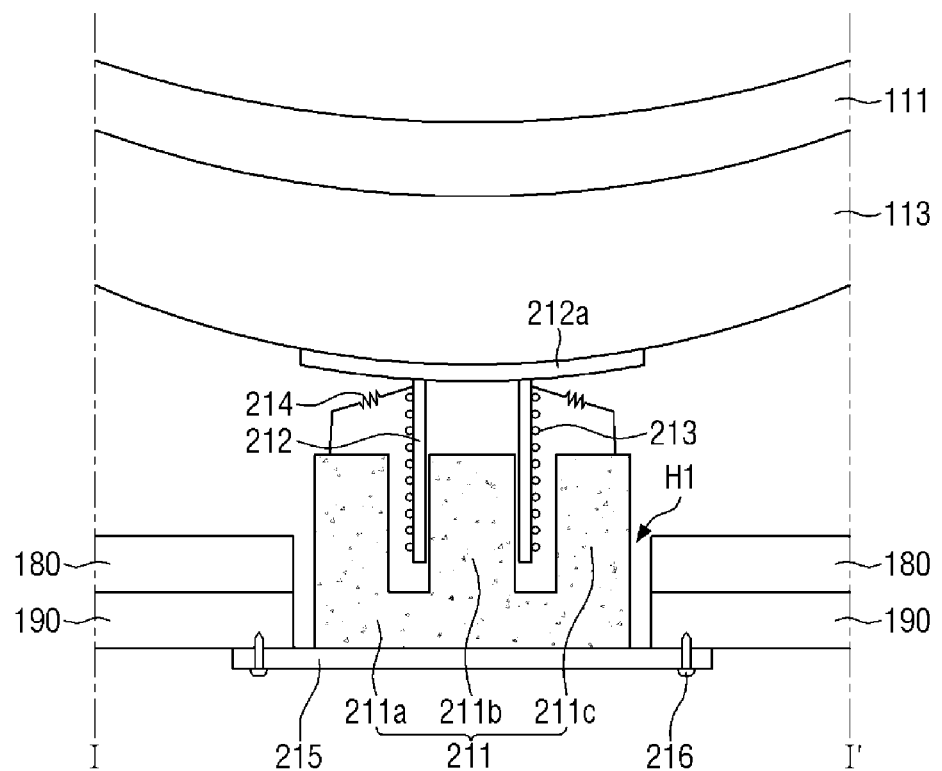

The first, second, third and fourth sound generating devices 210, 220, 230 and 240 may be exciters that vibrate the display panel 110 by generating a magnetic force using a voice coil, as illustrated in FIGS. 5, 6A, and 6B. Alternatively, the first, second, third and fourth sound generating devices 210, 220, 230 and 240 may be piezoelectric elements that vibrate the display panel 110 by contracting or expanding in response to a voltage applied thereto, as illustrated in FIGS. 7 and 8A through 8C.

The camera device 400 may be disposed in the camera hole CH of the upper set cover 101. Accordingly, the camera device 400 may capture an image of the background at the front of the display device 10. The camera device 400 may include a complementary metal oxide semiconductor ("CMOS") image sensor or a charge-coupled device ("CCD") image sensor.

The camera device 400 may be electrically connected to the system circuit board. The camera device 400 may output an image captured by the camera device 400 to the system circuit board, and a viewing distance calculation unit 410, which calculates the user's viewing distance by analyzing an image captured by the camera device 400, may be disposed on the system circuit board. The viewing distance calculation unit 410 may output information data ID including the user's viewing distance information to the image-sound matching unit 171.

In an embodiment of the invention, as described above with reference to FIGS. 1 through 3, the display device 10 may output sound by allowing the first, second, third and fourth sound generating devices 210, 220, 230 and 240 to use the display panel 110 as a diaphragm. In such an embodiment, the display device 10 may output sound in the front direction thereof, such that the quality of sound can be improved. In such an embodiment, due to the presence of the first, second, third, and fourth sound generating devices 210, 220, 230, and 240, a speaker disposed on the bottom surface or a side of a typical display device may be omitted.

In an embodiment as described above with reference to FIGS. 1 through 3, the display device 10 may adjust the first, second, third and fourth sound generated by the first, second, third and fourth sound generating devices 210, 220 230, and 240 based on a change in the location of the first object by applying, to the plurality of sound data, the first gain values calculated based on the location of the first object. Accordingly, sound generated by each sound generating device may be controlled based on the distance between the first object and each sound generating device, such that the user can feel as if sound were output from the first object. Therefore, the user can be provided with realistic sound that matches the displayed image.

In an embodiment as described above with reference to FIGS. 1 through 3, the display device 10 may be a mid- to large-size display device including a plurality of source drivers 121, but the disclosure is not limited thereto. In an embodiment, the display device 10 may be a small-size display device including only one source driver 121, in which case, the flexible films 122, the source circuit boards 140, and the cables 150 may not be provided. The source driver 121 and the timing control unit 170 may be incorporated into a single IC and may then be attached onto a single FPCB or on the first substrate 111 of the display panel 110. Here, the mid- to large-size display device include a monitor, a TV and the like, for example, and a small-size display device include a smartphone, a tablet PC and the like, for example.

FIG. 5 is a cross-sectional view illustrating an exemplary embodiment of a first sound generating device of FIG. 3. FIGS. 6A and 6B are cross-sectional views illustrating how a display panel is vibrated by the first sound generating device of FIG. 5. Specifically, FIGS. 5, 6A and 6B are corresponding to cross-sectional views taken along line I-I' of FIG. 3.

Referring to FIGS. 5, 6A, and 6B, an embodiment of the first sound generating device 210 may be an exciter for vibrating the display panel 110 by generating a magnetic force using a first voice coil. The first sound generating device 210 may include a first magnet 211, a bobbin 212, a first voice coil 213, dampers 214, and a lower plate 215.

The first magnet 211 may be a permanent magnet, and a sintered magnet such as a barium ferrite magnet may be used as the permanent magnet. The first magnet 211 may be a ferric trioxide ($Fe_2O_3$) magnet, a barium carbonate ($BaCO_3$) magnet, a neodymium magnet, a strontium ferrite magnet with an improved magnetic component, or an Al, nickel (Ni) or cobalt (Co) cast alloy magnet, but the disclosure is not limited thereto. The neodymium magnet may be, for example, a neodymium-iron-boron (Nd—Fe—B) magnet.

The first magnet 211 may include a plate 211*a*, a central protruding part 211*b* protruding from a center portion of the plate 211*a*, and a sidewall part 211*c* protruding from an edge portion of the plate. The central protruding part 211*b* and the sidewall part 211*c* may be spaced apart from each other with a predetermined distance, such that a predetermined space may be defined or formed between the central protruding part 211*b* and the sidewall part 211*c*. In such an embodiment, the first magnet 211 may have a cylindrical shape. in such an embodiment, the first magnet 211 may be in a shape of a cylinder with a circular space defined or formed at one of the bases thereof.

The central protruding part 211*b* of the first magnet 211 may have N-pole magnetism, and the plate 211*a* and the sidewall part 211*c* may have S-pole magnetism. As a result, an external magnetic field may be formed between the central protruding part 211*b* and the plate 211*a* of the first magnet 211 and between the central protruding part 211*b* and the sidewall part 211*c* of the first magnet 211.

The bobbin 212 may be in a cylindrical shape. The central protruding part 211*b* of the first magnet 211 may be disposed in the bobbin 212. In an embodiment, the bobbin 212 may be disposed to surround the central protruding part 211*b* of the first magnet 211. The sidewall part 211*c* of the first magnet 211 may be disposed on an outside of the bobbin 212. In an embodiment, the sidewall part 211*c* of the first magnet 211 may be disposed to surround the bobbin 212. Spaces may be defined or formed between the bobbin 212 and the central protruding part 211*b* of the first magnet 211 and between the bobbin 212 and the sidewall part 211*c* of the first magnet 211.

The bobbin 212 may include a bobbin base 212a for supporting the bobbin 212. The bobbin base 212a may be attached to a heat dissipation film 113 via an adhesive member. The adhesive member may be a double-sided tape. In an embodiment where the heat dissipation film 113 is omitted, the bobbin base 212a may be attached to the first substrate 111.

The bobbin 212 and the bobbin base 212a may include or be formed of a pulp- or paper-processed material, Al, Mg or an alloy thereof, a synthetic resin such as polypropylene, or polyamide-based fibers.

The first voice coil 213 may be wound around an outer circumferential surface of the bobbin 212. One end of the first voice coil 213 adjacent to one end of the bobbin 212 may receive a first driving voltage (hereinafter, 1A driving voltage), and the other end of the first voice coil 213 adjacent to the other end of the bobbin 212 may receive a second first driving voltage (hereinafter, 1B driving voltage). As a result, a current may flow in the first voice coil 213 in response to the 1A and 1B driving voltages. An applied magnetic field may be formed around the first voice coil 213 depending on the current that flows in the first voice coil 213. That is, the direction of the current that flows in the first voice coil 213 when the 1A driving voltage is a positive voltage and the 1B driving voltage is a negative voltage may be opposite to the direction of the current that flows in the first voice coil 213 when the 1A driving voltage is a negative voltage and the 1B driving voltage is a positive voltage. As the first and second driving voltages are alternately driven, the N pole and the S pole of the applied magnetic field may be changed in a way such that an attracting force and a repulsive force can be alternately acted upon the first magnet 211 and the first voice coil 213. Accordingly, the bobbin 212, which has the first voice coil 213 wound therearound, may reciprocate in a thickness direction of the first substrate 111 of the display panel 110 or the heat dissipation film 113, as illustrated in FIGS. 6A and 6B. As a result, the display panel 110 and the heat dissipation film 113 can vibrate in the thickness direction thereof, and sound may be output.

The dampers 214 may be disposed between the top of the bobbin 212 and the sidewall part 211c of the first magnet 211. The dampers 214 may contract or expand in response to the vertical movement of the bobbin 212 and may thus control the vertical vibration of the bobbin 212. In such an embodiment, where the dampers 214 are connected between the bobbin 212 and the sidewall part 211c of the first magnet 211, the vertical movement of the bobbin 212 may be limited by the restoring force of the dampers 214. In one embodiment, for example, when the bobbin 212 vibrates above or below a predetermined height, the bobbin 212 may return to its original location due to the restoring force of the dampers 214.

The lower plate 215 may be disposed on a bottom surface of the first magnet 211. The lower plate 215 may be integrally formed in a single and unitary body with the first magnet 211 or may be formed as a separate element from the first magnet 211. In an embodiment where the lower plate 215 and the first magnet 211 are formed as separate elements from each other, the first magnet 211 may be attached to the lower plate 215 via an adhesive member such as a double-sided tape.

The lower plate 215 may be fixed to a circuit board 190 via fixing members 216 such as screws. As a result, the first magnet 211 of the first sound generating device 210 may be fixed to the circuit board 190.

The circuit board 190 may be disposed on, and fixed to, the lower cover 180. The circuit board 190 of FIG. 5 may be the control circuit board 160, the system circuit board, the power circuit board, or a dummy circuit board. The dummy circuit board refers to a PCB or an FPCB where no other circuits than the first sound generating device 210 are disposed. The circuit board 190 may be a PCB or an FPCB, in which a hole corresponding to the first hole H1 of the lower cover 180 may be defined or formed.

FIGS. 5, 6A and 6B illustrate an embodiment where the first magnet 211 and the lower plate 215 of the first sound generating device 210 are fixed to the circuit board 190, but the disclosure is not limited thereto. Alternatively, the first magnet 211 and the lower plate 215 of the first sound generating device 210 may be fixed to the lower cover 180, instead of being fixed to the circuit board 190.

The second, third and fourth sound generating devices 220, 230 and 240 may be substantially the same as the first sound generating device 210 of FIGS. 5, 6A, and 6B.

Figure 7:
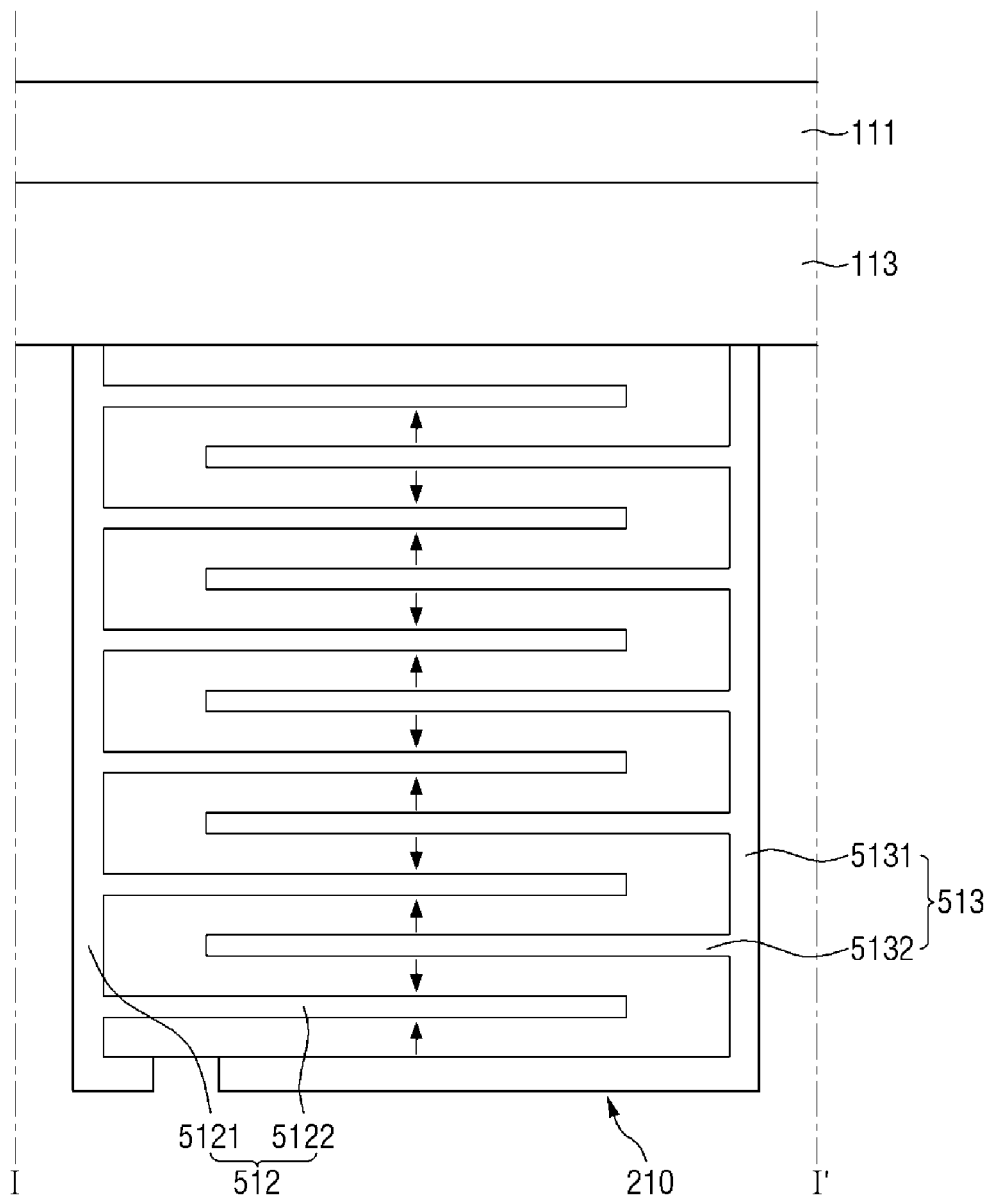
FIG. 7 is a cross-sectional view illustrating an alternative exemplary embodiment of the first sound generating device of FIG. 3.
Figure 8A:
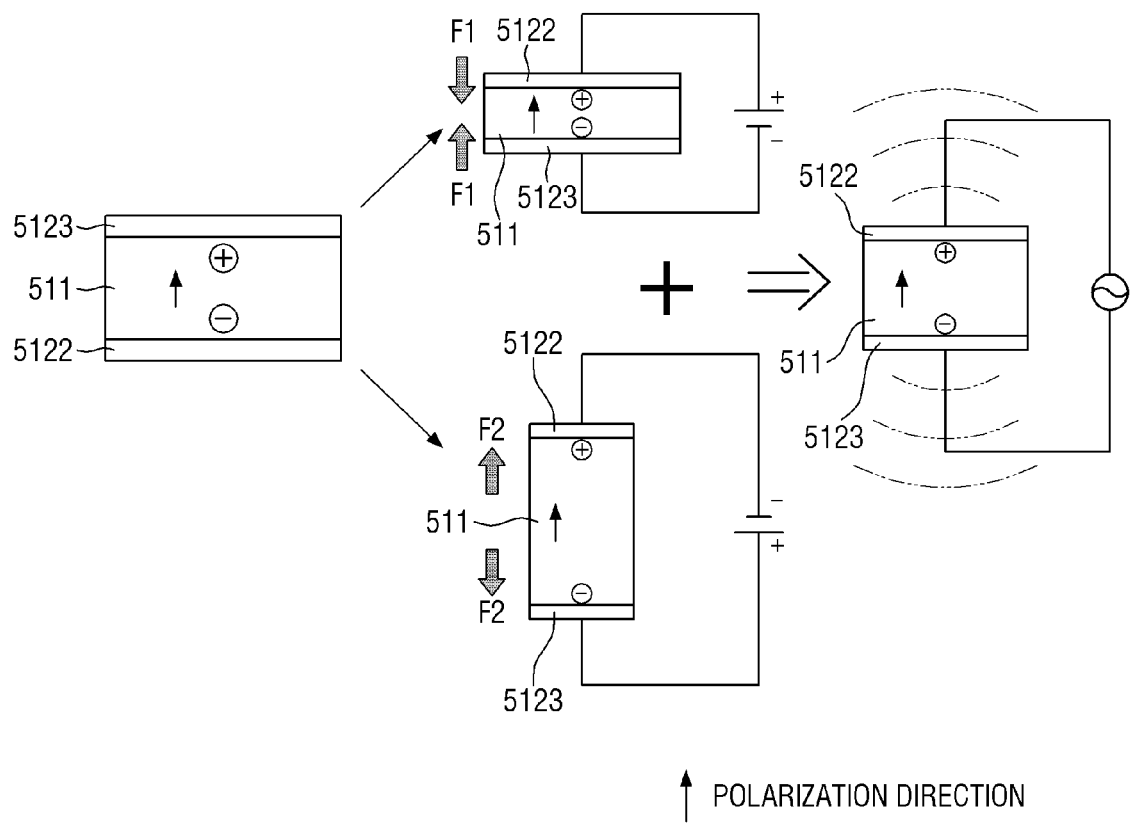
FIG. 8A is a view illustrating how a vibration layer disposed between first branch electrodes and second branch electrodes of the first sound generating device vibrates.
Figure 8B:
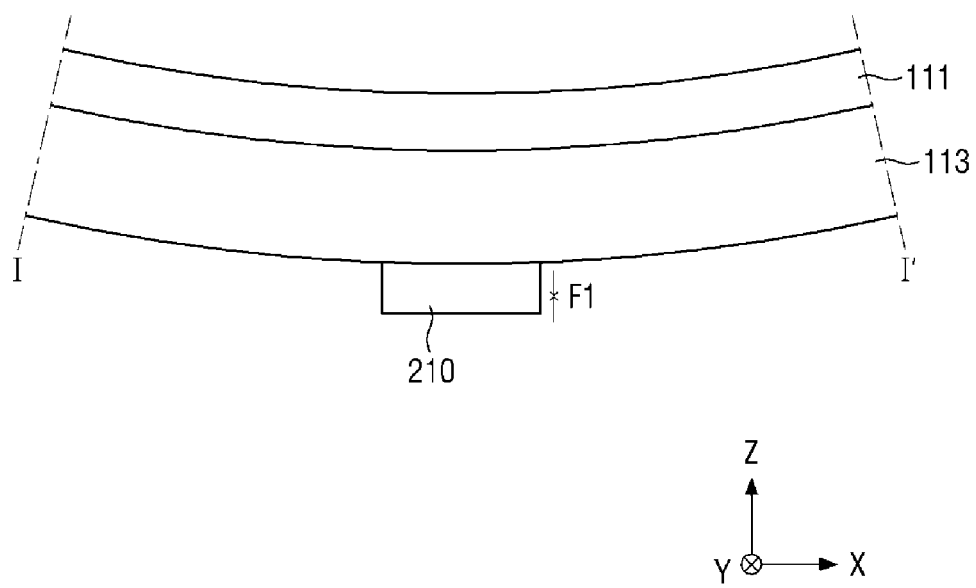
FIGS. 8B and 8C are side views illustrating how a display panel is vibrated by the first sound generating device.
Figure 8C:
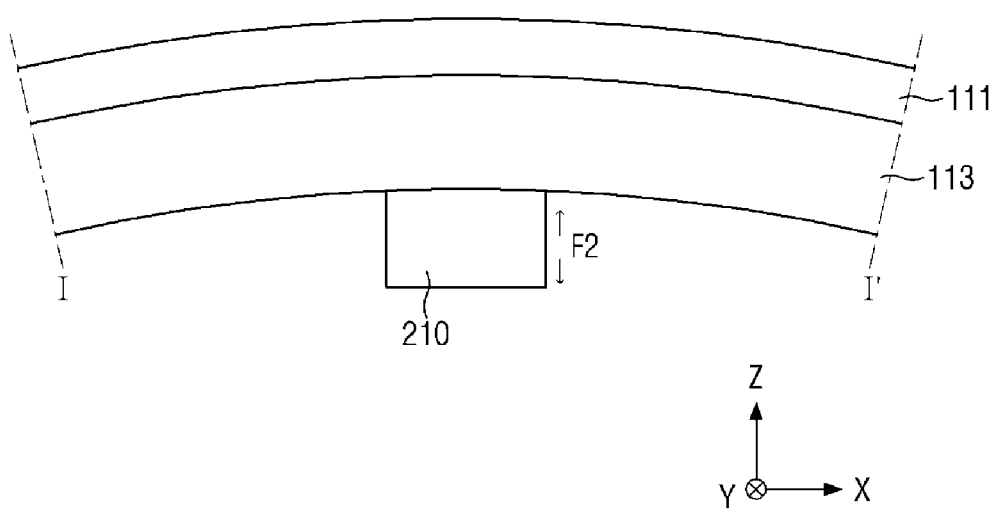

FIG. 7 is a cross-sectional view illustrating an alternative exemplary embodiment of the first sound generating device of FIG. 3. FIG. 8A is a view illustrating how a vibration layer disposed between first branch electrodes and second branch electrodes of the first sound generating device of FIG. 7 vibrates. FIGS. 8B and 8C are side views illustrating how a display panel is vibrated by the first sound generating device of FIG. 7. Specifically, FIGS. 7, 8B, and 8C are corresponding toy cross-sectional views taken along line I-I' of FIG. 3.

Referring to FIGS. 7 and 8A through 8C, an embodiment of the first sound generating device 210 may include a piezoelectric element that contracts or expands in respond to a voltage applied thereto and thereby vibrates a display panel 110. The first sound generating device 210 may be attached to the heat dissipation film 113. In an embodiment where the heat dissipation film 113 is omitted, the first sound generating device 210 may be attached to the first substrate 111. The first sound generating device 210 may include a vibration layer 511, a first electrode 512, and a second electrode 513.

The first electrode 512 may include a first stem electrode 5121 and first branch electrodes 5122. The first stem electrode 5121 may be disposed on one side of the vibration layer 511 or may be disposed on more than one side of the vibration layer 511. The first stem electrode 5121 may be disposed on a top surface of the vibration layer 511. The first branch electrodes 5122 may be branched off from the first stem electrode 5121. The first branch electrodes 5122 may be disposed in parallel to one another.

The second electrode 513 may include a second stem electrode 5131 and second branch electrodes 5132. The second stem electrode 5131 may be disposed on another side of the vibration layer 511 or may be disposed on more than one side of the vibration layer 511. The first stem electrode 5121 may be disposed on one of the sides of the vibration layer 511 where the second stem electrode 5131 is not disposed. The second stem electrode 5131 may be disposed on the top surface of the vibration layer 511. The first and second stem electrodes 5121 and 5131 may not overlap with each other. The second branch electrodes 5132 may be branched off from the second stem electrode 5131. The second branch electrodes 5132 may be disposed in parallel to one another.

The first branch electrodes 5122 and the second branch electrodes 5132 may be disposed in parallel to one another in a horizontal direction, which is a direction perpendicular to the thickness direction of the first substrate 111 of the display panel 110 or the heat dissipation film 113 (or a X- or Y-axis direction). The first branch electrodes 5122 and the second branch electrodes 5132 may be alternately disposed in a vertical direction, which is the thickness direction of the first substrate 111 of the display panel 110 or the heat dissipation film 113 (or a Z-axis direction). That is, the first branch electrodes 5122 and the second branch electrodes 5132 may be disposed repeatedly in the order of a first branch electrode 5122, a second branch electrode 5132, a first branch electrode 5122, and a second branch electrode 5132 along the vertical direction (or the Z-axis direction).

The first and second electrodes 512 and 513 may be connected to the sound circuit board. The sound circuit board may be connected to the first and second electrodes 512 and 513, which are disposed on a bottom surface of the first sound generating device 210.

The vibration layer 511 may be a piezoelectric actuator that is deformed by first and second driving voltages applied to the first and second electrodes 512 and 513, respectively. In an embodiment, the vibration layer 511 may be a piezoelectric material such as a polyvinylidene difluoride ("PVDF") film or lead zirconate titanate ("PZT") and an electroactive polymer.

Since the vibration layer 511 is fabricated at high temperature, the first and second electrodes 512 and 513 may include or be formed of a metal with a high melting point such as Ag or an alloy of Ag and Pd. In an embodiment where the first and second electrodes 512 and 513 are formed of an alloy of Ag and Pd, the Ag content of the alloy of Ag and Pd may be greater than the Pd content of the alloy of Ag and Pd to raise the melting point of the first and second electrodes 512 and 513.

The vibration layer 511 may be disposed between the first branch electrodes 5122 and the second branch electrodes 5132. The vibration layer 511 contracts or expands depending on the difference between the first driving voltage applied to the first branch electrodes 5122 and the second driving voltage applied to the second branch electrodes 5132.

In an embodiment, when the polarity of the vibration layer 511 between the first branch electrodes 5122 and their respective underlying second branch electrodes 5132 has an upward direction (↑), as illustrated in FIG. 7, the vibration layer 511 may have a positive polarity in upper parts thereof adjacent to the first branch electrodes 5122 and a negative polarity in lower parts thereof adjacent to the second branch electrodes 5132. In such an embodiment, when the polarity of the vibration layer 511 between the second branch electrodes 5132 and their respective underlying first branch electrodes 5122 has a downward direction (↓), as illustrated in FIG. 8B, the vibration layer 511 may have a negative polarity in the upper parts thereof adjacent to the first branch electrodes 5122 and a positive polarity in the lower parts thereof adjacent to the second branch electrodes 5132. The direction of the polarity of the vibration layer 511 may be determined by a poling process for applying an electric field to the vibration layer 511 using the first branch electrodes 5122 and the second branch electrodes 5132.

The direction of the polarity of the vibration layer 511 between the first branch electrodes 5122 and their respective underlying second branch electrodes 5132 may be the upward direction (↑), as illustrated in FIG. 8A. In this case, in response to a positive 2A driving voltage and a negative 2B driving voltage being applied to the first branch electrodes 5122 and the second branch electrodes 5132, respectively, the vibration layer 511 may contract by a first force F1. The first force F1 may be a contraction force. On the other hand, in response to a negative 2A driving voltage and a positive 2B driving voltage being applied to the first branch electrodes 5122 and the second branch electrodes 5132, respectively, the vibration layer 511 may expand by a second force F2. The second force F2 may be an extension force.

Similarly, the direction of the polarity of the vibration layer 511 between the second branch electrodes 5132 and their respective underlying first branch electrodes 5122 may be the downward direction (↓). In this case, in response to a positive 2A driving voltage and a 2B negative driving voltage being applied to the second branch electrodes 5132 and the first branch electrodes 5122, respectively, the vibration layer 511 may expand by an extension force. On the other hand, in response to a negative 2A driving voltage and a positive 2B driving voltage being applied to the second branch electrodes 5132 and the first branch electrodes 5122, respectively, the vibration layer 511 may contract by a contraction force. The second force F2 may be a contraction force.

According to the embodiment of FIGS. 7 and 8A through 8C, when driving voltages applied to the first and second electrodes 512 and 513, respectively, alternately change from a positive polarity to a negative polarity repeatedly, the vibration layer 511 repeatedly contracts and expands. As a result, the first sound generating device 210 vibrates.

In an embodiment, where the first sound generating device 210 is disposed on the heat dissipation film 113, the display panel 110 may vibrate vertically due to stress, as illustrated in FIGS. 8B and 8C, as the vibration layer 511 of the first sound generating device 210 contracts and expands. Since the display panel 110 may be vibrated by the first sound generating device 210, the display device 10 may output sound.

The second, third, and fourth sound generating devices 220, 230, and 240 may be substantially the same as the first sound generating device 210 of FIGS. 7 and 8A through 8C.

Figure 9:
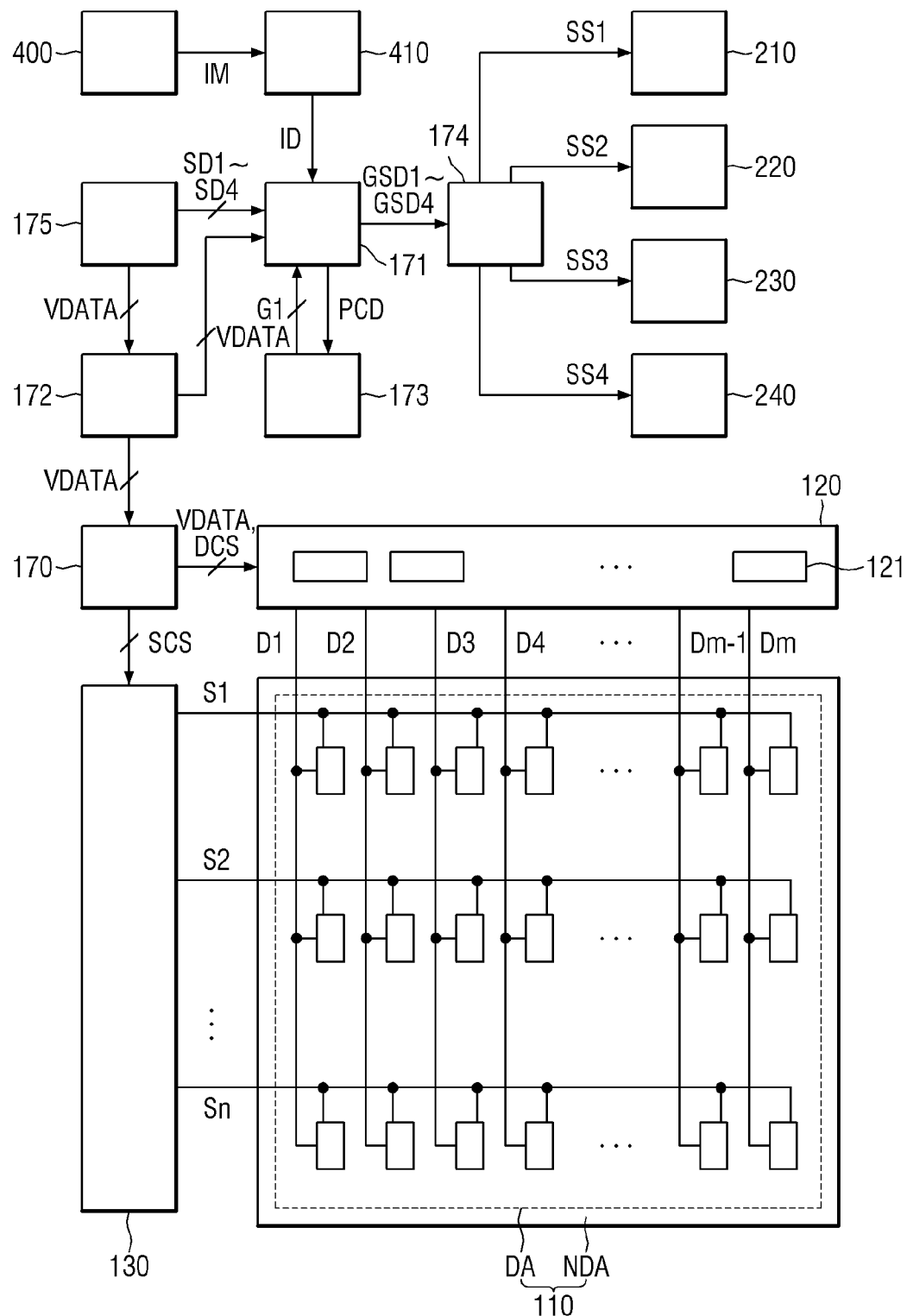
FIG. 9 is a block diagram of the display device of FIG. 1.

FIG. 9 is a block diagram of the display device of FIG. 1.

Referring to FIG. 9, an embodiment of the display device 10 includes the display panel 110, a data driving unit 120, a scan driving unit 130, the timing control unit 170, the image-sound matching unit 171, the memory 172, a plurality of lookup tables 173, the sound driving unit 174, a system-on-chip 175, the first sound generating device 210, the second sound generating device 220, the third sound generating device 230, the fourth sound generating device 240, the camera device 400, and the viewing distance calculation unit 410.

The display panel 110 may be divided into a display area DA and a non-display area NDA, which is disposed on the periphery of the display area DA. The display area DA is an area in which pixels are disposed to display images. The display panel 110 may include data lines D1 through Dm (where m is an integer of 2 or greater), scan lines S1 through Sn (where n is an integer of 2 or greater), which intersect the data lines D1 through Dm, and the pixels PX, which are connected to the data lines D1 through Dm and the scan lines S1 through Sn. The display panel 110 may further include first power supply voltage lines, to which a first power supply voltage is supplied, and a second power supply voltage line, to which a second power supply voltage is supplied, and the second power supply voltage may be lower than the first power supply voltage. In an embodiment, each of the pixels may be electrically connected to one of the first power supply voltage lines and to the second power supply voltage line. Each of the pixels may include a light-emitting element and a plurality of transistors and one or more capacitors for providing a current to the light-emitting element. The pixels of the display panel 110 will be described later in greater detail with reference to FIG. 11.

The data driving unit 120 may include a plurality of source drivers 121. The data driving unit 120 receives digital video data VDATA and a source control signal DCS from the timing control unit 170. The data driving unit 120 converts the digital video data VDATA into analog data voltages based on the source control signal DCS and provides the analog data voltages to the data lines D1 through Dm of the display panel 110.

The scan driving unit 130 receives a scan control signal SCS from the timing control unit 170. The scan driving unit 130 generates scan signals based on the scan control signal SCS and provides the scan signals to the scan lines S1 through Sn of the display panel 110. The scan driving unit 130 may include a plurality of transistors and may be disposed in the non-display area NDA of the display panel 110. Alternatively, the scan driving unit 130 may be formed as an IC and may be mounted on a gate flexible film attached to one side of the display panel 110.

The timing control unit 170 receives the digital video data VDATA from the memory 172. The timing control unit 170 may generate control signals for controlling the operation timings of the data driving unit 120 and the scan driving unit 130. The control signals may include the source control signal DCS, which is for controlling the operation timing of the data driving unit 120, and the scan control signal SCS, which is for controlling the operation timing of the scan driving unit 130. The timing control unit 170 may output the source control signal DCS to the data driving unit 120 and may output the scan control signal SCS to the scan driving unit 130.

The image-sound matching unit 171 receives the digital video data VDATA, which corresponds to the X frame periods, from the memory 172 and receives first, second, third, and fourth sound data SD1, SD2, SD3 and SD4 from the system-on-chip 175. Here, X is an integer of 2 or greater. In such an embodiment, the image-sound matching unit 171 receives the information data ID, which includes the user's viewing distance information, from the viewing distance calculation unit 410.

The image-sound matching unit 171 calculates the first object by analyzing the digital video data VDATA, and calculates pixel coordinate PC (shown in FIGS. 10A and 10B) of the first object, which represents the location of the first object. The image-sound matching unit 171 may select one of the lookup tables 173 based on the information data ID. The image-sound matching unit 171 receives first gain values G1 corresponding to pixel coordinate data PCD, which includes the pixel coordinate PC of the first object, from the selected lookup table 173. The image-sound matching unit 171 applies the first gain values G1 to each of the first, second, third, and fourth sound data SD1, SD2, SD3, and SD4. The first gain values G1 may include four gain values (hereinafter, 1A, 1B, 1C and 1D gain values), which are to be applied to the first, second, third, and fourth sound data SD1, SD2, SD3 and SD4, respectively. The image-sound matching unit 171 may output first sound data GSD1, which is obtained by applying the 1A gain value to the first sound data SD1, second sound data GSD2, which is obtained by applying the 1B gain value to the second sound data SD2, third sound data GSD3, which is obtained by applying the 1C gain value to the third sound data SD3, and fourth sound data GSD4, which is obtained by applying the 1D gain value to the fourth sound data SD4, to the sound driving unit 174.

The memory 172 receives the digital video data VDATA from the system-on-chip 175. The memory 172 may store the digital video data VDATA, which corresponds to the X frame periods. The memory 172 may store digital video data VDATA of an image to be displayed after several seconds by the display panel 110. The memory 172 may be a volatile memory such as a register, an SRAM, or a DRAM. The memory 172 outputs the digital video data VDATA to the timing control unit 170 and the image-sound matching unit 171.

The lookup tables 173 may be memories where A-th, B-th, C-th and D-th gain values GA, GB, GC and GD corresponding to each pair of pixel coordinate PC of the display panel 110 are stored, as illustrated in FIGS. 10A and 10B. Each pair of pixel coordinate PC of the display panel 110 may be represented as (x, y). In an embodiment where the display panel 110 has an ultra-high definition (UHD) resolution, the display panel 110 may include 3840×2160 pixels, and each of the lookup tables 173 may store A-th, B-th, C-th and D-th gain values GA, GB, GC, and GD corresponding to each pair of pixel coordinate PC ranging from (1, 1) to (3840, 2160). Here, the A-th gain value GA may be a gain value to be applied to the first sound data SD1, the B-th gain value GB may be a gain value to be applied to the second sound data SD2, the C-th gain value GC may be a gain value to be applied to the third sound data SD3, and the D-th gain value GD may be a gain value to be applied to the fourth sound data SD4.

Since the gain values corresponding to each pair of pixel coordinate PC on the display panel 110 vary depending on the user's viewing distance, the lookup tables 173 may be classified depending on the user's viewing distance. The lookup tables 173 may include a first lookup table 173a in which A-th, B-th, C-th and D-th gain values corresponding to each pair of pixel coordinate PC on the display panel 110 when the user's viewing distance is a first viewing distance are stored and a second lookup table in which A-th, B-th, C-th and D-th gain values corresponding to each pair of pixel coordinate PC on the display panel 110 when the user's viewing distance is a second viewing distance are stored. The A-th, B-th, C-th and D-th gain values corresponding to each pair of pixel coordinate PC on the display panel 110 may differ from the first lookup table 173a to the second lookup table.

The image-sound matching unit 171 selects one of the lookup tables 173 based on the user's viewing distance, which is included in the information data ID, and outputs the pixel coordinate data PCD, which includes pixel coordinate information of the first object, to the selected lookup table 173. The selected lookup table 173 calculates A-th, B-th, C-th and D-th gain values corresponding to the pixel coordinate information included in the pixel coordinate data PCD into first gain values GD1, i.e., the 1A, 1B, 1C and 1D gain values, and outputs the 1A, 1B, 1C and 1D gain values to the image-sound matching unit 171.

The sound driving unit 174 receives the first, second, third and fourth sound data GSD1, GSD2, GSD3 and GSD4 from the image-sound matching unit 171. The sound driving unit 174 converts the first sound data GSD1, which is a digital signal, into a first sound signal SS1, which is an analog signal, and outputs the first sound signal SS1 to the first sound generating device 210. In such an embodiment, the sound driving unit 174 converts the second sound data GSD2, which is a digital signal, into a second sound signal SS2, which is an analog signal, and outputs the second sound signal SS2 to the second sound generating device 220. In such an embodiment, the sound driving unit 174 converts the third sound data GSD3, which is a digital signal, into a third sound signal SS3, which is an analog signal, and outputs the third sound signal SS3 to the third sound generating device 230. In such an embodiment, the sound driving unit 174 converts the fourth sound data GSD4, which is a digital signal, into a fourth sound signal SS4, which is an analog signal, and outputs the fourth sound signal SS4 to the fourth sound generating device 240.

The sound driving unit 174 may include a DSP for processing sound data, which are digital signals, a DAC for converting the digital signals processed by the DSP into analog signals, i.e., driving voltages of each of the first, second, third and fourth sound signals SS1, SS2, SS3 and SS4, and an AMP for amplifying and outputting the driving voltages of each of the first, second, third and fourth sound signals SS1, SS2, SS3 and SS4. The driving voltages of each of the first, second, third and fourth sound signals SS1, SS2, SS3 and SS4 may include positive and negative driving voltages.

The system-on-chip 175 may convert the resolution of the digital video data VDATA to comply with the resolution of the display panel 110. The system-on-chip 175 may output the digital video data VDATA to the memory 172. The system-on-chip 175 may rearrange or divide sound data input thereto based on the number of sound generating devices provided in the display device 10 and the locations of the sound generating devices. In one embodiment, for example, the sound data input to the system-on-chip 175 may include left-side sound data and right-side sound data. In such an embodiment, the system-on-chip 175 may generate the first and third sound data SD1 and SD3, which are for driving the first and third sound generating devices 210 and 230, respectively, that are disposed adjacent to a left edge of the display panel 110, using the left-side sound data. In such an embodiment, the system-on-chip 175 may generate the second and fourth sound data SD2 and SD4, which are for driving the second and fourth sound generating devices 220 and 240, respectively, that are disposed adjacent to a right edge of the display panel 110, using the right-side sound data. The system-on-chip 175 may output the first, second, third and fourth sound data SD1, SD2, SD3 and SD4 to the image-sound matching unit 171.

The first sound generating device 210 may output first sound by vibrating the first area A1 of the display panel 110 based on the driving voltages of the first sound signal SS1. The second sound generating device 220 may output second sound by vibrating the second area A2 of the display panel 110 based on the driving voltages of the second sound signal SS2. The third sound generating device 230 may output third sound by vibrating the third area A3 of the display panel 110 based on the driving voltages of the third sound signal SS3. The fourth sound generating device 240 may output fourth sound by vibrating the fourth area A4 of the display panel 110 based on the driving voltages of the fourth sound signal SS4.

The camera device 400 may capture an image IM of the background at a front of the display device 10 and may output the captured image IM to the viewing distance calculation unit 410.

The viewing distance calculation unit 410 may analyze the captured image IM and may calculate the user's viewing distance using a predetermined algorithm. In one embodiment, for example, the viewing distance calculation unit 410 may detect edges of an object from the captured image IM and may determine the object as being the head of the user if the detected edges match a previously-stored shape. In such an embodiment, the viewing distance calculation unit 410 may calculate the user's viewing distance based on the location and the size of the object. In an embodiment, when the sizes of the object at the center, the left side and the right side of the front of the display device 10 are the same as each other, the viewing distance calculation unit 410 may determine that the closer the object is to the center of the front of the display device 10, the smaller the user's viewing distance is. In such an embodiment, the viewing distance calculation unit 410 may determine that the smaller the size of the object is, the greater the user's viewing distance is. The viewing distance calculation unit 410 may output the information data ID, which includes the user's viewing distance information, to the image-sound matching unit 171.

In an embodiment shown in FIG. 9, the display device 10 may adjust the first, second, third and fourth sound generated by the first, second, third and fourth sound generating devices 210, 220, 230 and 240 based on a change in the location of the first object by applying, to the plurality of sound data, the first gain values calculated based on the location of the first object. Accordingly, in such an embodiment, sound generated by each sound generating device may be controlled based on the distance between the first object and each sound generating device, such that the user can feel as if sound were output from the first object. Therefore, the user may be provided with realistic sound that matches the displayed image.

FIG. 11 is a cross-sectional view illustrating an exemplary embodiment of pixels of the display panel of FIG. 9.

Referring to FIG. 11, an embodiment of the display panel 110 may include the first substrate 111, the second substrate 112, the TFT layer TFTL, the light-emitting element layer EML, the filler member FL, the wavelength conversion layer QDL, and the color filter layer CFL.

A buffer film 302 may be disposed or formed on a surface of the first substrate 111 that faces the second substrate 112. The buffer film 302 may be disposed or formed on the first substrate 111 to protect TFTs 335 and light-emitting elements against moisture that may penetrate thereinto through the first substrate 111, which may be susceptible to moisture. The buffer film 302 may include a plurality of inorganic films that are alternately stacked one on another. In one embodiment, for example, the buffer film 302 may be a multilayer film in which a silicon oxide (SiOx) film, a silicon nitride (SiNx) film, and/or a silicon oxynitride (SiON) film are alternately stacked one on another. Alternatively, the buffer film 302 may be omitted.

The TFT layer TFTL is disposed or formed on the buffer film 302. The TFT layer TFTL includes TFTs 335, a gate insulating film 336, an interlayer insulating film 337, a passivation film 338, and a planarization film 339.

The TFTs 335 are disposed or formed on the buffer film 302. Each of the TFTs 335 includes an active layer 331, a gate electrode 332, a source electrode 333, and a drain electrode 334. FIG. 11 illustrates an embodiment where the TFTs 335 have a top gate structure in which the gate electrode 332 is disposed above the active layer 331, but the disclosure is not limited thereto. Alternatively, the TFTs 335 may have a bottom gate structure in which the gate electrode 332 is disposed below the active layer 331 or a double gate structure in which the gate electrode 332 is disposed both above and below the active layer 331.

The active layer 331 is disposed or formed on the buffer film 302. The active layer 331 may include or be formed of a silicon-based semiconductor material or an oxide-based semiconductor material. A light-shielding layer for blocking external light incident on the active layer 331 may be disposed or formed between the buffer layer and the active layer 331.

A gate insulating film 336 may be disposed or formed on the active layer 331. The gate insulating film 316 may be an inorganic film such as, for example, a silicon oxide film, a silicon nitride film, or a multilayer film thereof.

The gate electrode 332 and a gate line may be disposed or formed on the gate insulating film 316. The gate electrode 332 and the gate line may be formed as a single-layer film or a multilayer films including molybdenum (Mo), Al, chromium (Cr), gold (Au), titanium (Ti), Ni, neodymium (Nd), Cu, or an alloy thereof.

The interlayer insulating film 337 may be disposed or formed on the gate electrode 332 and the gate line. The interlayer insulating film 337 may be an inorganic film such as, for example, a silicon oxide film, a silicon nitride film, or a multilayer film thereof.

The source electrode 333, the drain electrode 334 and a data line may be disposed or formed on the interlayer insulating film 337. The source electrode 333 and the drain electrode 334 may be connected to the active layer 331 through contact holes defined through the gate insulating film 336 and the interlayer insulating film 337. The source electrode 333, the drain electrode 334, and the data line may be a single-layer film or a multilayer films using Mo, Al, Cr, Au, Ti, Ni, Nd, Cu, or an alloy thereof.

The passivation film 338 may be disposed or formed on the source electrode 333, the drain electrode 334, and the data line to insulate the TFTs 335. The passivation film 338 may be formed as an inorganic film such as, for example, a silicon oxide film, a silicon nitride film, or a multilayer film thereof.

The planarization film 339 may be disposed or formed on the passivation film 338 to planarize height differences formed by the TFTs 335. The planarization film 339 may be formed as an organic film using an acrylic resin, an epoxy resin, a phenolic resin, a polyamide resin, or a polyimide resin.

The light-emitting element layer EML is disposed or formed on the TFT layer TFTL. The light-emitting element layer EML includes light-emitting elements and a pixel defining film 344.

The light-emitting elements and the pixel defining film 344 are disposed or formed on the planarization film 339. In an embodiment, the light-emitting elements may be OLEDs. In such an embodiment, each of the light-emitting elements may include an anode electrode 341, a light-emitting layer 342, and a cathode electrode 343.

The anode electrode 341 may be disposed or formed on the planarization film 339. The anode electrode 341 may be connected to the source electrode 333 through a contact hole defined through the passivation film 338 and the planarization film 339.

The pixel defining film 344 may be disposed or formed to cover edge portions of the anode electrode 341 to define a corresponding pixel. In such an embodiment, the pixel defining film 344 may define the pixels PX1, PX2, PX3. Each of the pixels PX1, PX2, PX3 may be a region in which the anode electrode 341, the light-emitting layer 342 and the cathode electrode 343 are sequentially stacked one on another, and holes from the anode electrode 341 and electrons from the cathode electrode 343 are combined in the light-emitting layer 342 to emit light.

The light-emitting layer 342 may be disposed or formed on the anode electrode 341 and the pixel defining film 344. The light-emitting layer 342 may be an organic light-emitting layer. The light-emitting layer 342 may emit blue light or short-wavelength light such as ultraviolet ("UV") light. The peak wavelength range of the blue light may be in a range of about 450 nanometers (nm) to about 490 nm, and the peak wavelength range of the UV light may be about 450 nm or shorter. In such an embodiment, the light-emitting layer 342 may be a common layer provided or formed in common for all the pixels PX1, PX2, PX3, and the display panel 110 may include the light wavelength conversion layer QDL, which converts the blue light or the short-wavelength light (such as UV light) emitted by the light-emitting layer 342 into a red light, a green light and a blue light, and the color filter layer CFL, which transmits the red light, the green light and the blue light therethrough.

The light-emitting layer 342 may include a hole transport layer, an emission layer, and an electron transport layer. The light-emitting layer 342 may have a tandem structure with two or more stacks, where a charge generating layer may be disposed or formed between the stacks.

The cathode electrode 343 may be disposed or formed on the light-emitting layer 342. The cathode electrode 343 may be disposed or formed to cover the light-emitting layer 342. The cathode electrode 343 may be a common layer provided or formed commonly for all pixels.

In an embodiment, the light-emitting element layer EML may be a top emission-type light-emitting element layer that emits light in a direction toward the second substrate 112, i.e., in an upper direction. In such an embodiment, the anode electrode 341 may include or be formed of a metal material with high reflectance such as a stack of Al and Ti (e.g., Ti/Al/Ti), a stack of Al and indium tin oxide ("ITO") (e.g., ITO/Al/ITO), a silver (Ag)-palladium (Pd)-copper (Cu) ("APC") alloy, or a stack of an APC alloy and ITO (e.g., ITO/APC/ITO), and the cathode electrode 343 may be formed of a transparent conductive oxide ("TCO") material such as ITO or indium zinc oxide ("IZO") that transmits light therethrough or a semi-transmissive conductive material such as magnesium (Mg), Ag, or an alloy thereof. In an embodiment where the cathode electrode 343 includes or is formed of a semi-transmissive conductive material, the emission efficiency of the light-emitting element layer 304 may be improved due to a micro-cavity effect.

The encapsulation film 345 is disposed or formed on the light-emitting element layer EML. The encapsulation film 345 effectively prevents oxygen or moisture from infiltrating into the light-emitting layer 342 and the cathode electrode 343. In such an embodiment, the encapsulation film 345 may include at least one inorganic film. The inorganic film may be formed of silicon nitride, aluminum nitride, zirconium nitride, titanium nitride, hafnium nitride, tantalum nitride, silicon oxide, aluminum oxide, or titanium oxide. The encapsulation film 345 may further include at least one organic film. The organic film may have a thickness sufficient to effectively prevent foreign particles from entering into the light-emitting layer 342 and the cathode electrode 343 through the encapsulation film 345. The organic film may include at least one of epoxy, acrylate, and urethane acrylate.

The color filter layer CFL is disposed on a surface of the second substrate 112 that faces the first substrate 111. The color filter layer CFL may include a black matrix 360 and color filters 370.

The black matrix 360 may be disposed or formed on the second substrate 112. The black matrix 360 may be disposed to overlap the pixel defining film 344, but to expose the pixels PX1, PX2, PX3. The black matrix 360 may include a black pigment or an opaque metal material capable of blocking light transmission not to allow light to transmit therethrough.

The color filters 370 may be disposed to overlap the pixels PX1, PX2, PX3. The color filters 370 may include a first color filter 371 disposed to overlap a first pixel PX1, a second color filter 372 disposed to overlap a second pixel PX2, and a third color filter 373 disposed to overlap a third pixel PX3. In such an embodiment, the first color filter 371 may be a first-color light transmitting filter that transmits light of a first color, the second color filter 372 may be a second-color light transmitting filter that transmits light of a second color, and the third color filter 373 may be a third-color light transmitting filter that transmits light of a third color. In one embodiment, for example, the first, second and third colors may be a red color, a green color and a blue color, respectively, but the disclosure is not limited thereto. The peak wavelength range of red light passing through the first color filter 371 may be in a range of about 620 nm to about 750 nm, the peak wavelength range of green light passing through the second color filter 372 may be in a range of about 500 nm to about 570 nm, and the peak wavelength range of blue light passing through the third color filter 373 may be in a range of about 450 nm to about 490 nm.

The color filters 370 may partially overlap the black matrix 360. Accordingly, the black matrix 360 may effectively prevent light emitted from the light-emitting layer 342 of one of the pixels PX1, PX2, PX3 from entering into the color filter 370 of another pixel, thereby effectively preventing color mixing.

In an embodiment, an overcoat layer (not shown) may be disposed or formed on the color filters 370 to planarize height differences caused by the color filters 370 and the black matrix 360. Alternatively, the overcoat layer may be omitted.

The wavelength conversion layer QDL is disposed on the color filter layer CFL. The wavelength conversion layer QDL may include a first capping layer 351, a first wavelength conversion layer 352, a second wavelength conversion layer 353, a third wavelength conversion layer 354, a second capping layer 355, an interlayer organic film 356, and a third capping layer 357.

The first capping layer 351 may be disposed on the color filter layer CFL. The first capping layer 351 effectively prevents moisture or oxygen from infiltrating into the first, second and third wavelength conversion layers 352, 353, and 354 through the color filter layer CFL. The first capping layer 351 may be include or formed as an inorganic film including an inorganic material, for example, silicon nitride, aluminum nitride, zirconium nitride, titanium nitride, hafnium nitride, tantalum nitride, silicon oxide, aluminum oxide or titanium oxide.

The first, second and third wavelength conversion layers 352, 353, and 354 may be disposed on the first capping layer 351.

The first wavelength conversion layer 352 may be disposed to overlap the first pixel PX1. The first wavelength conversion layer 352 may convert the blue light or the short-wavelength light (such as UV light) emitted from the light-emitting layer 342 of the first pixel PX1 into light of the first color. In such an embodiment, the first wavelength conversion layer 352 may include a first base resin, a first wavelength shifter, and a first scatterer.

The first base resin may include or be formed of a material having high light transmittance and excellent dispersion characteristics for the first wavelength shifter and the first scatterer. In one embodiment, for example, the first base resin may include an organic material such as an epoxy resin, an acrylic resin, a cardo resin, or an imide resin.

The first wavelength shifter may convert or shift the wavelength of incident light. The first wavelength shifter may be quantum dots, quantum rods, or a phosphor. In an embodiment where the first wavelength shifter is quantum dots, which are a semiconductor nanocrystal material, may have a predetermined band gap depending on the composition and the size thereof. Thus, the first wavelength shifter may absorb incident light and may then emit light of a predetermined wavelength. The first wavelength shifter may have a core-shell structure consisting of a core including nanocrystals and a shell surrounding the core. In such an embodiment, the nanocrystals include group IV nanocrystals, group II-VI compound nanocrystals, group III-V compound nanocrystals, group IV-VI nanocrystals, or a combination thereof, for example. The shell may serve as a passivation layer for preventing chemical deformation of the core to maintain semiconductor characteristics and/or as a charging layer for imparting the quantum dots electrophoretic characteristics. The shell may have a single-layer structure or a multilayer structure. In an embodiment, the shell include an oxide of a metal or a non-metal, a semiconductor compound, or a combination thereof, for example.

The first scatterer may have a different refractive index from the first base resin and may form an optical interface with the first base resin. In one embodiment, for example, the first scatterer may be light-scattering particles. In one embodiment, for example, the first scatterer may be metal oxide particles such as particles of titanium oxide ($TiO_2$), silicon oxide ($SiO_2$), zirconium oxide ($ZrO_2$), aluminum oxide ($Al_2O_3$), zinc oxide (ZnO), or tin oxide ($SnO_2$). In an alternative example, the first scatterer may be organic particles such as particles of an acrylic resin or a urethane resin.

The first scatterer may scatterer incident light in random directions without substantially changing the wavelength of light passing through the first wavelength conversion layer 352. In such an embodiment, the path of light transmitting the first wavelength conversion layer 352 can be lengthened, and the color conversion efficiency of the first wavelength shifter can be improved.

The first wavelength conversion layer 352 may overlap the first color filter 371. Thus, some of the blue light or the short-wavelength light (such as UV light) provided by the first pixel PX1 may pass through the first wavelength conversion layer 352 as it is without being converted into light of the first color by the first wavelength shifter. However, the blue light or the short-wavelength light (such as UV light) incident upon the first color filter 371 without being converted by the first wavelength conversion layer 352 may not pass through the first color filter 371. In such an embodiment, the light of the first color obtained by the first wavelength conversion layer 352 may pass through the first color filter 371 and may be emitted in a direction toward the second substrate 112.

The second wavelength conversion layer 353 may be disposed to overlap the second pixel PX2. The second wavelength conversion layer 353 may convert the blue light or the short-wavelength light (such as UV light) emitted from the light-emitting layer 342 of the second pixel PX2 into light of the second color. In such an embodiment, the second wavelength conversion layer 353 may include a second base resin, a second wavelength shifter, and a second scatterer. The second base resin, the second wavelength shifter, and the second scatterer of the second wavelength conversion layer 353 are substantially the same as the first base resin, the first wavelength shifter, and the first scatterer, respectively, of the first wavelength conversion layer 352, and thus, any repetitive detailed descriptions thereof will be omitted. In an embodiment, where the first and second wavelength shifters are both quantum dots, a diameter of the second wavelength shifter may be smaller than a diameter of the first wavelength shifter.

The second wavelength conversion layer 353 may overlap the second color filter 372. Thus, some of the blue light or the short-wavelength light (such as UV light) provided by the second pixel PX2 may pass through the second wavelength conversion layer 353 as it is without being converted into light of the second color by the second wavelength shifter. However, the blue light or the short-wavelength light (such as UV light) incident upon the second color filter 372 without being converted by the second wavelength conversion layer 353 may not pass through the second color filter 372. In such an embodiment, the light of the second color obtained by the second wavelength conversion layer 353 may pass through the second color filter 372 and may be emitted in the direction toward the second substrate 112.

The third wavelength conversion layer 354 may be disposed to overlap the third pixel PX3. The third wavelength conversion layer 354 may convert the blue light or the short-wavelength light (such as UV light) emitted from the light-emitting layer 342 of the third pixel PX3 into light of the third color. In such an embodiment, the third wavelength conversion layer 354 may include a third base resin, a third wavelength shifter, and a third scatterer. The third base resin, the third wavelength shifter, and the third scatterer of the third wavelength conversion layer 354 are substantially the same as the first base resin, the first wavelength shifter, and the first scatterer, respectively, of the first wavelength conversion layer 352, and thus, any repetitive detailed descriptions thereof will be omitted.

The third wavelength conversion layer 354 may overlap the third color filter 373. Thus, some of the blue light or the short-wavelength light (such as UV light) provided by the third pixel PX3 may pass through the third wavelength conversion layer 354 as it is and may then be emitted in the direction toward the second substrate 112 through the third color filter 373.

The second capping layer 355 may be disposed on the first, second and third wavelength conversion layers 352, 353 and 354 and parts of the first capping layer 351 that are exposed without being covered by the first, second and third wavelength conversion layers 352, 353 and 354. The second capping layer 355 effectively prevents moisture or oxygen from infiltrating into the first, second and third wavelength conversion layers 352, 353, and 354. The second capping layer 355 may include or be formed as an inorganic film including an inorganic material, for example, silicon nitride, aluminum nitride, zirconium nitride, titanium nitride, hafnium nitride, tantalum nitride, silicon oxide, aluminum oxide or titanium oxide.

The interlayer organic film 356 may be disposed on the second capping layer 355. The interlayer organic film 356 may be a planarization layer for planarizing height differences formed by the first, second and third wavelength conversion layers 352, 353 and 354. The interlayer organic film 356 may include or be formed as an organic film including an organic material such as an acrylic resin, an epoxy resin, a phenolic resin, a polyamide resin, or a polyimide resin, for example.

The third capping layer 357 may be disposed on the interlayer organic film 356. The third capping layer 357 may include or be formed as an inorganic film including an inorganic material, for example, silicon nitride, aluminum nitride, zirconium nitride, titanium nitride, hafnium nitride, tantalum nitride, silicon oxide, aluminum oxide, or titanium oxide.

The filler member FL may be disposed between the encapsulation film 345, which is disposed on the first substrate 111, and the third capping layer 357, which is disposed on the second substrate 112. The filler member FL may be formed of a material having a buffer function. In one embodiment, for example, the filler member FL may include or be formed as an organic film including an organic material such as an acrylic resin, an epoxy resin, a phenolic resin, a polyamide resin, or a polyimide resin, for example.

In a non-display area of the display panel 110, a sealing member for bonding the first and second substrates 111 and 112 may be disposed, and in a plan view, the filler member FL may be surrounded by the sealing member. The sealing member may be glass frit or a sealant.

According to an embodiment of FIG. 11, the pixels PX1, PX2, PX3 emit blue light or short-wavelength light such as UV light, the light from the first pixel PX1, which overlaps the first color filter 371, may be converted into light of the first color through the first wavelength conversion layer 352 and may then be output through the first color filter 371, light from the second pixel PX2, which overlaps the second color filter 372, may be converted into light of the second color through the second wavelength conversion layer 353 and may then be output through the second color filter 372, and the light from the third pixel PX3, which overlaps the third color filter 373, may be output through the third wavelength conversion layer 354 and the third color filter 373. Accordingly, white light may be output.

According to an embodiment of FIG. 11, the pixels PX1, PX2, PX3 are driven in a top emission manner and emit light in the direction toward the second substrate 112, such that a heat dissipation film including an opaque material such as graphite or Al may be disposed on the first substrate 111.

Figure 12:
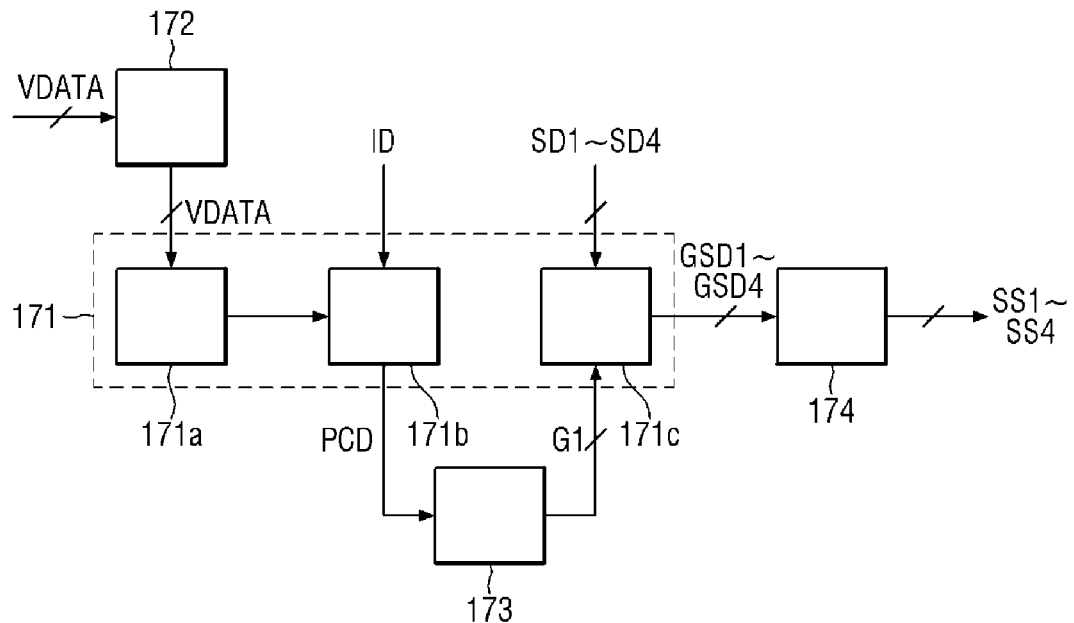
FIG. 12 is a block diagram illustrating an exemplary embodiment of an image-sound matching unit of FIG. 9.
Figure 13A:
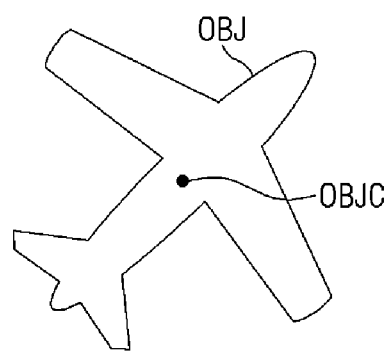
FIGS. 13A through 13C are schematic views illustrating how to calculate the pixel coordinate of a first object in a displayed image.
Figure 13B:
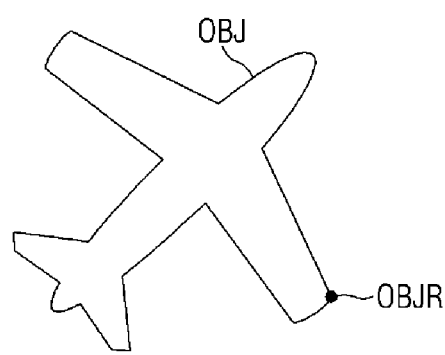
Figure 13C:
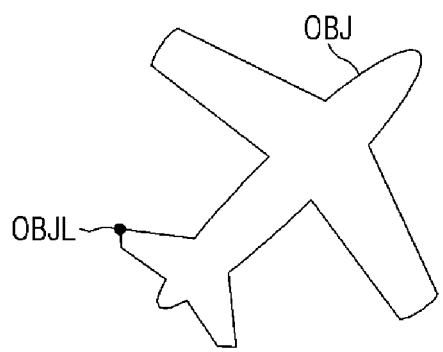

FIG. 12 is a block diagram illustrating an exemplary embodiment of the image-sound matching unit of FIG. 9. FIGS. 13A through 13C are schematic views illustrating how to calculate the pixel coordinate of a first object in a displayed image.

Referring to FIG. 12, an embodiment of an image-sound matching unit 171 may include an object calculator 171a, a pixel coordinate calculator 171b, and a gain value applicator 171c.

The object calculator 171a receives digital video data VDATA corresponding to the X frame periods from the memory 172. The object calculator 171a calculates or detects a first object OBJ in a displayed image, which is displayed based on the digital video data VDATA, by analyzing the digital video data VDATA. The first object OBJ may be an object or a person that commonly appears in all the digital video data VDATA. Alternatively, the first object OBJ may be an object or a person that commonly appears in all digital video data corresponding to Y frame periods (where Y is an integer and $2 \leq Y \leq X-1$) among the X frame periods.

In an embodiment, the object calculator 171a may convert the digital video data VDATA into edges of an object in a displayed image, i.e., a plurality of edge data ED that show the outlines of the object in the displayed image. As illustrated in FIGS. 13A through 13C, in an image displayed based on the plurality of edge data ED, the outlines of an object have a black gradation, and the rest of the image may have a white gradation. Thus, the object calculator 171a may calculate an area surrounded by the outlines of an object having a black gradation as the first object OBJ.

The pixel coordinate calculator 171b may receive the information data ID, which includes the user's viewing distance, from the viewing distance calculation unit 410. The pixel coordinate calculator 171b may select one of the lookup tables 173 based on the information data ID.

The pixel coordinate calculator 171b receives the plurality of edge data ED from the object calculator 171a. The pixel coordinate calculator 171b may calculate the pixel coordinate of one of the plurality of edge data ED. In one embodiment, for example, the pixel coordinate calculator 171b may calculate pixel coordinate OBJC of the center of the first object OBJ, as illustrated in FIG. 13A, may calculate pixel coordinate OBJL of the leftmost part of the first object OBJ, as illustrated in FIG. 13B, or may calculate pixel coordinate OBJR of the rightmost part of the first object OBJ, as illustrated in FIG. 13C. In one alternative embodiment, for example, the pixel coordinate calculator 171b may calculate the pixel coordinate of the uppermost part of the first object OBJ or may calculate the pixel coordinate of the lowermost part of the first object OBJ.

The pixel coordinate calculator 171b outputs the pixel coordinate data PCD, which is includes pixel coordinate information of the first object OBJ, to the selected lookup table 173. The pixel coordinate calculator 171b may obtain or look up first gain values G1 corresponding to the pixel coordinate data PCD in the selected lookup table 173 and may output the first gain values G1 to the gain value applicator 171c.

The gain value applicator 171c receives the first gain values G1 from the selected lookup table 173. The first gain values G1 may include the 1A, 1B, 1C and 1D gain values, which are to be applied to the first, second, third and fourth sound data SD1, SD2, SD3, and SD3, respectively. The 1A gain value may be determined based on the distance between the first object OBJ and the first sound generating device 210, the 1B gain value may be determined based on the distance between the first object OBJ and the second sound generating device 220, the 1C gain value may be determined based on the distance between the first object OBJ and the third sound generating device 230, and the 1D gain value may be determined based on the distance between the first object OBJ and the fourth sound generating device 240. That is, the distance between the first object and each sound generating device may be variously determined based on the pixel coordinate of the first object OBJ, and the 1A, 1B, 1C, and 1D gain values may be variously changed based thereon.

The closer the first object OBJ is to each sound generating device, the greater the first gain values G1 may become. In an embodiment, the sum of the 1A, 1B, 1C and 1D gain values may be 1. Accordingly, in such an embodiment, the combination of the first, second, third, and fourth sound output based on the first, second, third, and fourth sound data SD1, SD2, SD3, and SD4, respectively, may be heard by the user as if it were output from the first object OBJ.

The gain value applicator 171c receives the first, second, third and fourth sound data SD1, SD2, SD3 and SD4 from the system-on-chip 175. The gain value applicator 171c applies the first gain values G1 to the first, second, third and fourth sound data SD1, SD2, SD3 and SD4, that is, the gain value applicator 171c may apply the 1A, 1B, 1C and 1D gain values to the first, second, third and fourth sound data SD1, SD2, SD3 and SD4, respectively.

According to an embodiment of FIG. 12, the first, second, third and fourth sound generated by the first, second, third and fourth sound generating devices 210, 220, 230 and 240 may be adjusted based on a change in the location of the first object OBJ by applying the first gain values G1, which are calculated based on the pixel coordinate of the first object OBJ, to the first, second, third and fourth sound data SD1, SD2, SD3 and SD4. Accordingly, sound generated by each sound generating device may be controlled based on the distance between the first object OBJ and each sound generating device, such that the user can feel as if sound were output from the first object OBJ. Therefore, the user may be provided with realistic sound that matches the displayed image.

Figure 14:
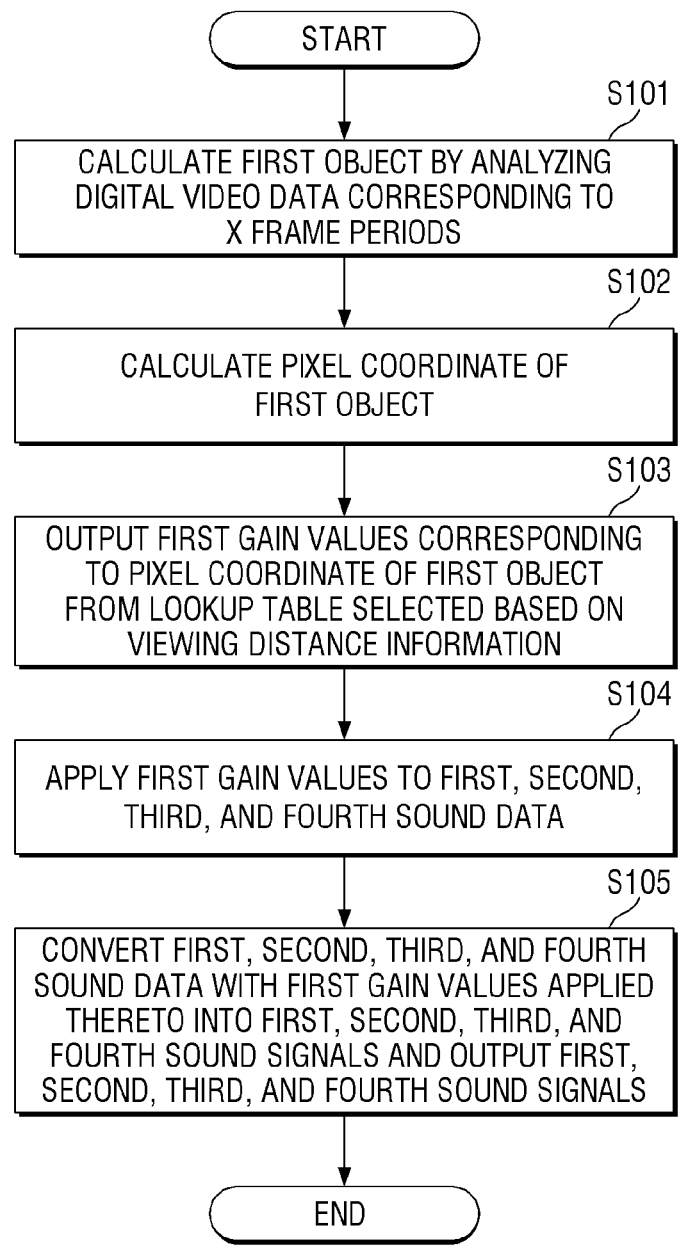
FIG. 14 is a flowchart illustrating a method of providing sound that matches a displayed image according to an embodiment of the disclosure.
Figure 15A:
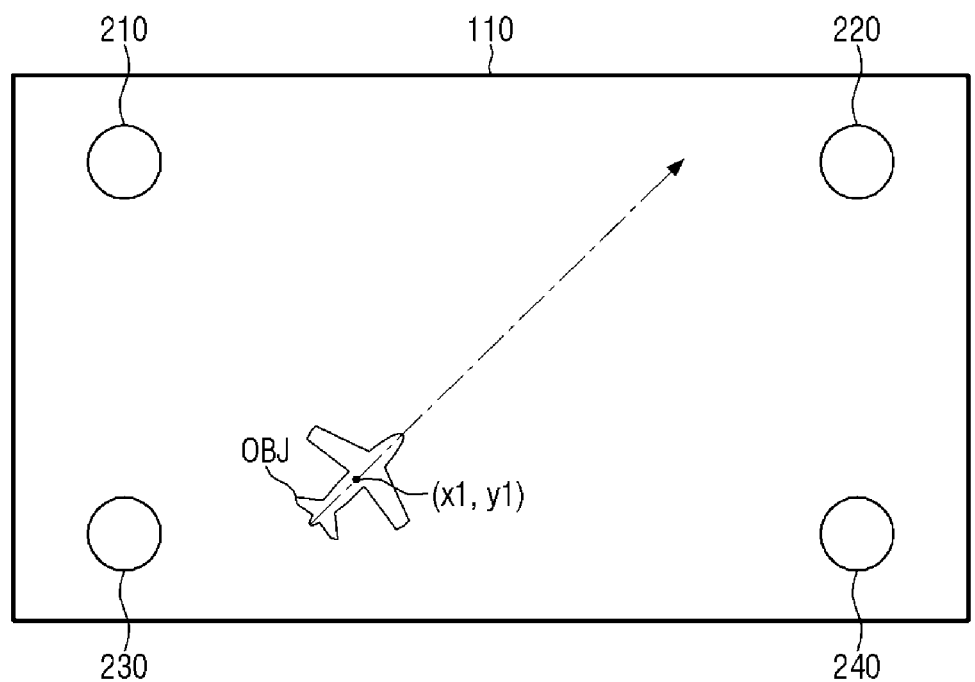
FIGS. 15A through 15C are schematic views illustrating how the location of a first object in a displayed image changes between a-th, b-th and c-th frame periods of the displayed image.
Figure 15B:
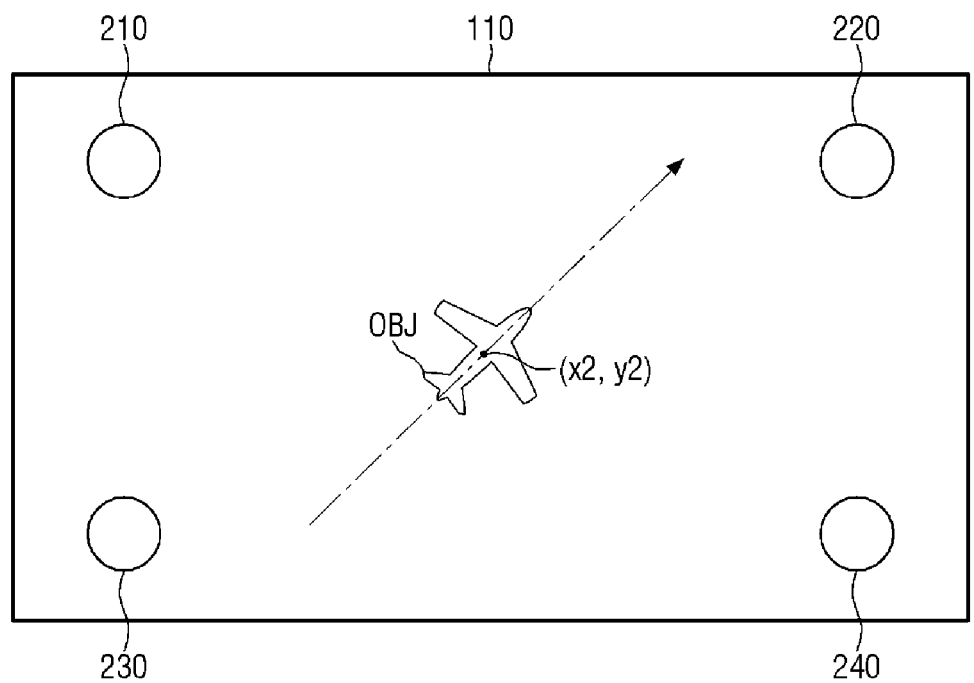
Figure 15C:
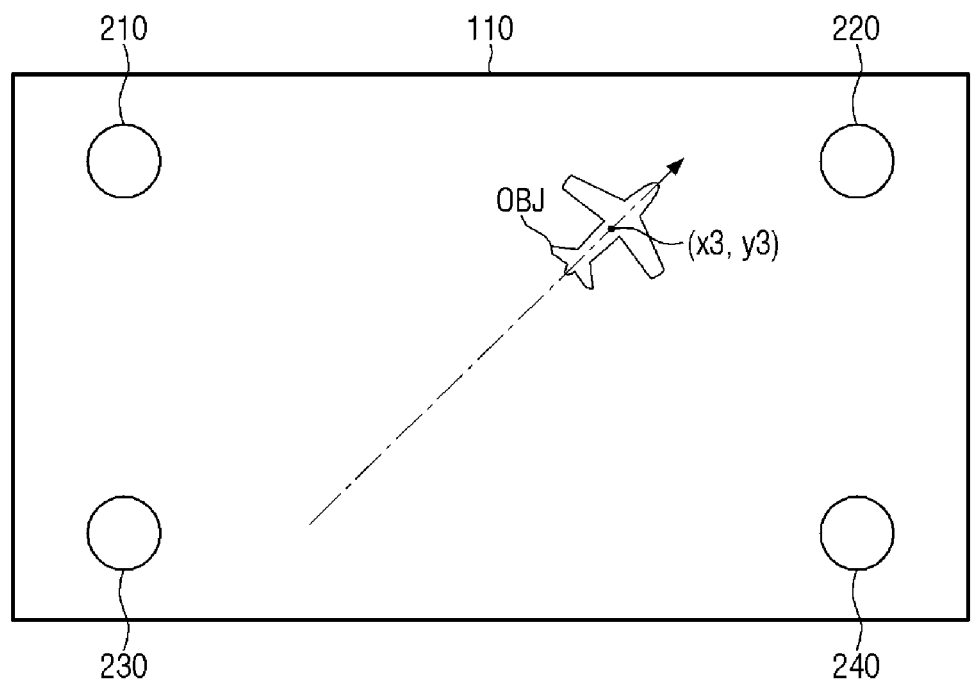

FIG. 14 is a flowchart illustrating a method of providing sound that matches a displayed image according to an embodiment of the disclosure. FIGS. 15A through 15C are schematic views illustrating how the location of a first object in a displayed image changes between a-th, b-th and c-th frame periods of the displayed image.

Specifically, FIG. 15A shows an a-th frame period of a displayed image (where A is an integer satisfying the following inequality: $1 \leq a \leq X-1$), FIG. 15B shows a b-th frame period of the displayed image (where b is an integer satisfying the following inequality: $a+1 \leq b \leq c-1$), and FIG. 15C shows a c-th frame period of the displayed image (where c is an integer satisfying the following inequality: $b+1 \leq c \leq X$).

A method of providing sound that matches a displayed image according to an embodiment of the disclosure will hereinafter be described with reference to FIGS. 12, 14, and 15A through 15C.

Referring to FIG. 14, the image-sound matching unit 171 calculates the first object OBJ (S101) by analyzing the digital video data VDATA, which corresponds to the X frame periods.

The first object OBJ may be an object or a person that commonly appears in all the X frame periods. Alternatively, the first object OBJ may be an object or a person that commonly appears in all the Y frame periods, which are among the X frame periods. FIGS. 15A through 15C illustrate a case where the first object OBJ is an airplane.

The object calculator 171a may convert the digital video data VDATA into edges of the first object OBJ, i.e., a plurality of edge data ED that show the outlines of the first object OBJ. As illustrated in FIGS. 13A through 13C, in an image displayed based on the plurality of edge data ED, the outlines of the first object OBJ have a black gradation, and the rest of the image may have a white gradation. Thus, the object calculator 171a may calculate an area surrounded by the outlines of an object having a black gradation as the first object OBJ.

Referring to FIGS. 15A through 15C, the first object OBJ may move from a lower left part to an upper right part of the displayed image corresponding to the digital video data VDATA, which corresponds to the X frame periods. As a result, the first object OBJ may be disposed closest to the third sound generating device 230 in the displayed image of FIG. 15A, may be disposed closest to the first sound generating device 210 in the displayed image of FIG. 15B, and may be disposed closest to the second sound generating device 220 in the displayed image of FIG. 15C.

Thereafter, the pixel coordinate calculator 171b of the image-sound matching unit 171 calculates the pixel coordinate of the first object OBJ, which represent the location of the first object OBJ in the displayed image (S102).

The pixel coordinate calculator 171b may calculate the coordinate of one of the plurality of edge data ED of the first object OBJ as the pixel coordinate of the first object OBJ. In one embodiment, for example, the pixel coordinate calculator 171b may calculate pixel coordinate OBJC of the center of the first object OBJ, as illustrated in FIG. 13A, may calculate pixel coordinate OBJL of the leftmost part of the first object OBJ, as illustrated in FIG. 13B, or may calculate pixel coordinate OBJR of the rightmost part of the first object OBJ, as illustrated in FIG. 13C. In one alternative embodiment, for example, the pixel coordinate calculator 171b may calculate the pixel coordinate of the uppermost part of the first object OBJ or may calculate the pixel coordinate of the lowermost part of the first object OBJ.

Thereafter, the pixel coordinate calculator 171b outputs first gain values G1 corresponding to the pixel coordinate data PCD, which includes the pixel coordinate of the first object OBJ, to the gain value applicator 171c of the image-sound matching unit 171 using one of the lookup tables 173 that is selected based on the information data ID, which is provided by the viewing distance calculation unit 410 (S103).

In an embodiment, the pixel coordinate calculator 171b may receive the information data ID, which includes the user's viewing distance, from the viewing distance calculation unit 410. The pixel coordinate calculator 171b may select one of the lookup tables 173 based on the information data ID. In such an embodiment, when the information data ID indicates that the user's viewing distance is the first viewing distance, the pixel coordinate calculator 171b may select the first lookup table 173a of FIG. 11A. In such an embodiment, when the information data ID indicates that the user's viewing distance is the second viewing distance, the pixel coordinate calculator 171b may select the second lookup table.

The pixel coordinate calculator 171b outputs the pixel coordinate data PCD, which is includes the pixel coordinate of the first object OBJ, to the selected lookup table 173. The pixel coordinate calculator 171b may output the first gain values G1 stored therein, which corresponds to the pixel coordinate data PCD, to the gain value applicator 171c. Referring to FIG. 15A, when the pixel coordinate of the first object OBJ are (x1, y1), for example, A-th, B-th, C-th and D-th gain values stored in the selected lookup table 173 to correspond to (x1, y1) may be output to the gain value applicator 171c as the first gain values G1. Referring to FIG. 15B, when the pixel coordinate of the first object OBJ are (x2, y2), for example, A-th, B-th, C-th and D-th gain values stored in the selected lookup table 173 to correspond to (x2, y2) may be output to the gain value applicator 171c as the first gain values G1. Referring to FIG. 15C, when the pixel coordinate of the first object OBJ are (x3, y3), for example, A-th, B-th, C-th and D-th gain values stored in the selected lookup table 173 to correspond to (x3, y3) may be output to the gain value applicator 171c as the first gain values G1.

Thereafter, the gain value applicator 171c may apply the first gain values G1 to the first, second, third and fourth sound data SD1, SD2, SD3 and SD4 (S104).

In an embodiment, the gain value applicator 171c receives the first gain values G1 from one of the lookup tables 173. The gain value applicator 171c receives the first, second, third and fourth sound data SD1, SD2, SD3 and SD4 from the system-on-chip 175.

The gain value applicator 171c applies the first gain values G1 to the first, second, third and fourth sound data SD1, SD2, SD3 and SD4. In an embodiment, the gain value applicator 171c may apply 1A, 1B, 1C and 1D gain values to the first, second, third and fourth sound data SD1, SD2, SD3, and SD4, respectively.

The 1A gain value may be determined based on the distance between the first object OBJ and the first sound generating device 210, the 1B gain value may be determined based on the distance between the first object OBJ and the second sound generating device 220, the 1C gain value may be determined based on the distance between the first object OBJ and the third sound generating device 230, and the 1D gain value may be determined based on the distance between the first object OBJ and the fourth sound generating device 240. In such an embodiment, the distance between the first object and each sound generating device may be variously determined based on the pixel coordinate of the first object OBJ, and the 1A, 1B, 1C and 1D gain values may be variously changed based thereon. The closer the first object OBJ is to each sound generating device, the greater the first gain values G1 may become.

In an embodiment, as shown in FIG. 15A, in the a-th frame period, the first object OBJ is closest to the third sound generating device 230, second closest to the first sound generating device 210, and third closest to the fourth sound generating device 240, and is farthest from the second sound generating device 220. In this case, among the first gain values G1 output from the selected lookup table 173 that correspond to the pixel coordinate of the first object OBJ in the a-th frame period, i.e., (x1, y1), the 1C gain value may be the greatest, the 1A gain value may be the second greatest, the 1D gain value may be third greatest, and the 1B gain value may be the smallest.

In an embodiment, as shown in FIG. 15B, in the b-th frame period, the first object OBJ is closest to the first sound generating device 210, second closest to the third sound generating device 230, and third closest to the second sound generating device 220, and is farthest from the fourth sound generating device 240. In this case, among the first gain values G1 output from the selected lookup table 173 that correspond to the pixel coordinate of the first object OBJ in the b-th frame period, i.e., (x2, y2), the 1A gain value may be the greatest, the 1C gain value may be the second greatest, the 1B gain value may be third greatest, and the 1D gain value may be the smallest.

In an embodiment, as shown in FIG. 15C, in the c-th frame period, the first object OBJ is closest to the second sound generating device 220, second closest to the fourth sound generating device 230, and third closest to the first sound generating device 210, and is farthest from the third sound generating device 230. In this case, among the first gain values G1 output from the selected lookup table 173 that correspond to the pixel coordinate of the first object OBJ in the c-th frame period, i.e., (x3, y3), the 1B gain value may be the greatest, the 1D gain value may be the second greatest, the 1A gain value may be third greatest, and the 1C gain value may be the smallest.

In an embodiment, as described above with reference to FIGS. 15A through 15C, the combination of the first, second, third and fourth sound output based on the first, second, third and fourth sound data GSD1, GSD2, GSD3 and GSD3, which are obtained using the first gain values G1, may be heard by the user as if it were output from the first object OBJ.

In an embodiment, the pixel coordinate calculator 171b may select both the first and second lookup tables 173a and 173b of FIGS. 11A and 11B if the information data ID indicates that the user's viewing distance is a third viewing distance, which is between the first and second viewing distances. In this case, the gain value applicator 171c may interpolate first gain values G1 received from the first lookup table 173a and first gain values G1 received from the second lookup table in consideration of the differences between the first and third viewing distances and between the second and third viewing distances and may then apply a value obtained from the interpolation to the first, second third, and fourth sound data SD1, SD2, SD3 and SD4.

Referring back to FIG. 14, the sound driving unit 174 converts the first, second, third and fourth sound data GSD1, GSD2, GSD3 and GSD4, which are obtained using the first gain values G1, into the first, second, third and fourth sound signals SS1, SS2, SS3 and SS4, which are analog signals, and outputs the first, second, third and fourth sound signals SS1, SS2, SS3 and SS4 (S105).

In an embodiment, referring back to FIG. 9, the sound driving unit 174 receives the first, second, third and fourth sound data GSD1, GSD2, GSD3 and GSD3, which are obtained using the 1A, 1B, 1C and 1D gain values, respectively, from the image-sound matching unit 171. The sound driving unit 174 outputs the first sound data GSD1, which is a digital signal, into the first sound signal SS1, which is an analog signal, and outputs the first sound signal SS1 to the first sound generating device 210. The sound driving unit 174 outputs the second sound data GSD2, which is a digital signal, into the second sound signal SS2, which is an analog signal, and outputs the second sound signal SS2 to the second sound generating device 220. The sound driving unit 174 outputs the third sound data GSD3, which is a digital signal, into the third sound signal SS3, which is an analog signal, and outputs the third sound signal SS3 to the third sound generating device 230. The sound driving unit 174 outputs the fourth sound data GSD4, which is a digital signal, into the fourth sound signal SS4, which is an analog signal, and outputs the fourth sound signal SS4 to the fourth sound generating device 240.

The first sound generating device 210 may output the first sound by vibrating the first area A1 of the display panel 110 in response to the driving voltages of the first sound signal SS1. The second sound generating device 220 may output the second sound by vibrating the second area A2 of the display panel 110 in response to the driving voltages of the second sound signal SS2. The third sound generating device 230 may output the third sound by vibrating the third area A3 of the display panel 110 in response to the driving voltages of the third sound signal SS3. The fourth sound generating device 240 may output the fourth sound by vibrating the fourth area A4 of the display panel 110 in response to the driving voltages of the fourth sound signal SS4.

According to an embodiment, as described above with reference to FIGS. 14 and 15A through 15C, the first, second, third and fourth sound generated by the first, second, third and fourth sound generating devices 210, 220, 230 and 240 may be adjusted based on a change in the location of the first object OBJ by applying the first gain values G1, which are calculated based on the pixel coordinate of the first object OBJ, to the first, second, third and fourth sound data SD1, SD2, SD3 and SD4. Accordingly, sound generated by each sound generating device may be controlled based on the distance between the first object OBJ and each sound generating device, such that the user may feel as if sound were output from the first object OBJ. Therefore, the user may be provided with realistic sound that matches the displayed image.

Figure 16A:
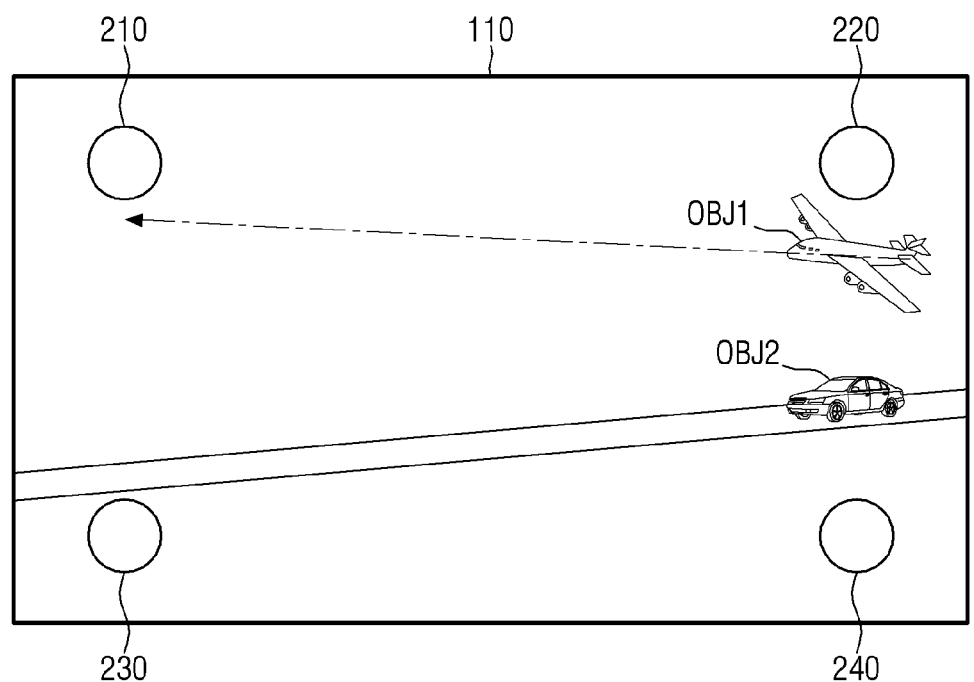
FIGS. 16A through 16C are schematic views illustrating how the locations of first and second objects in a displayed image change between a-th, b-th and c-th frame periods of the displayed image.
Figure 16B:
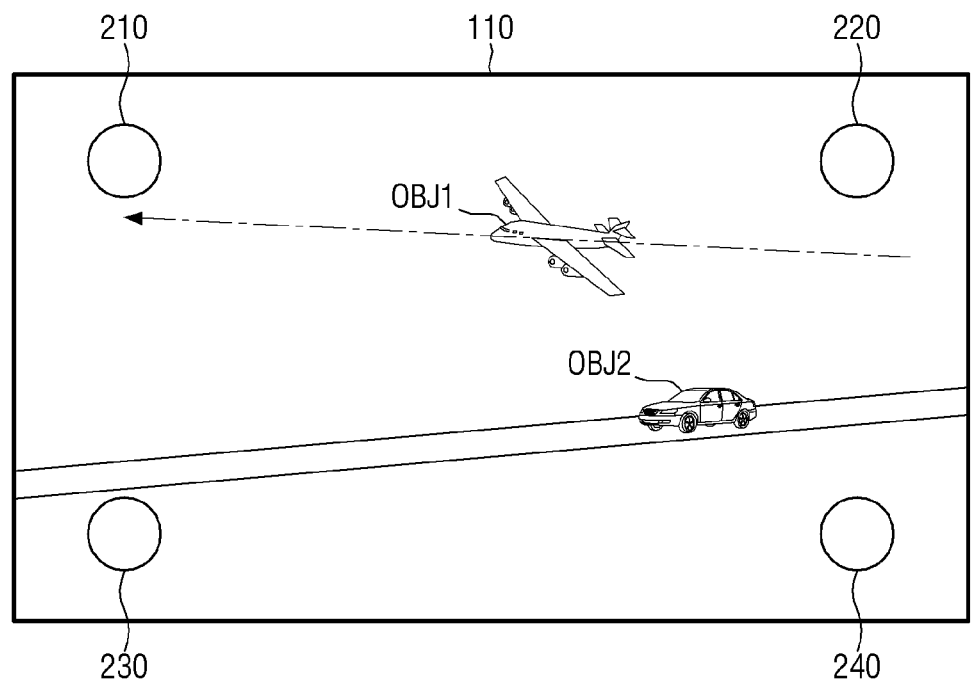
Figure 16C:
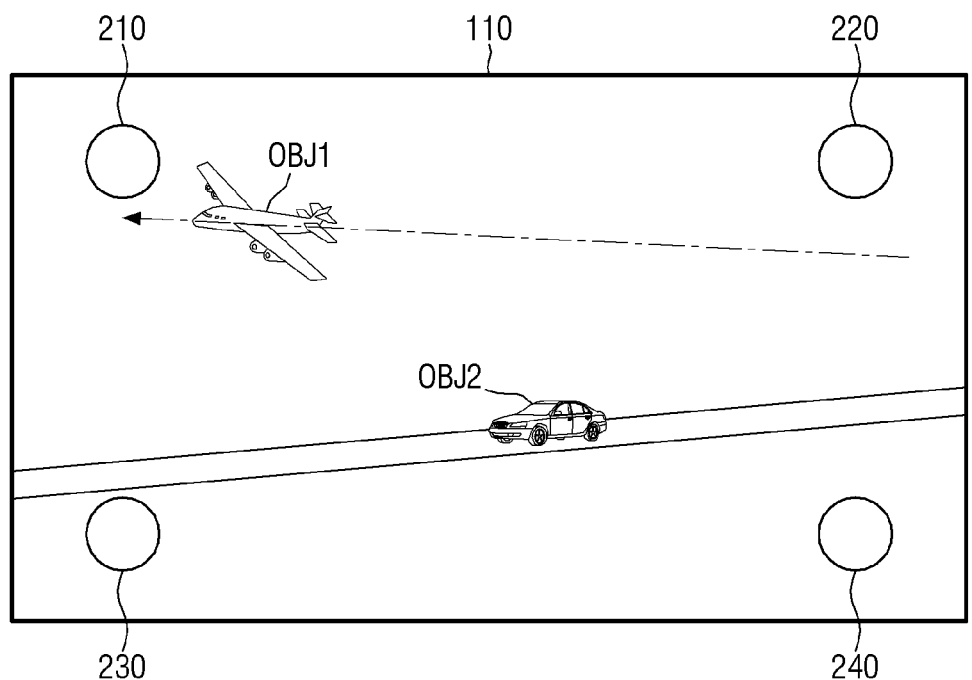

FIGS. 16A through 16C are schematic views illustrating how the locations of first and second objects in a displayed image change between a-th, b-th and c-th frame periods of the displayed image.

The embodiment of FIGS. 16A through 16C is substantially the same as the embodiment of FIGS. 15A through 15C except that the displayed image corresponding to the digital video data VDATA includes not only a first object OBJ1, but also a second object OBJ2. The same or like elements shown in FIGS. 16A through 16C. have been labeled with the same reference characters as used above to describe the embodiment of 15A through 15C, and any repetitive detailed description thereof will hereinafter be omitted or simplified.

Referring to FIGS. 16A through 16C, in an embodiment, the object calculator 171a calculates not only the first object OBJ1, but also the second object OBJ2, by analyzing the digital video data VDATA, which corresponds to the X frame periods, and the pixel coordinate calculator 171b calculates not only the pixel coordinate of the first object OBJ1, but also the pixel coordinate of the second object OBJ2. In such an embodiment, the pixel coordinate calculator 171b outputs not only pixel coordinate data PCD1 including pixel coordinate information of the first object OBJ1, but also pixel coordinate data PCD2 including pixel coordinate information of the second object OBJ2, to one of the lookup tables 173 that is selected. In such an embodiment, the selected lookup table 173 may output not only first gain values G1 corresponding to the pixel coordinate of the first object OBJ1, but also second gain values G2 corresponding to the pixel coordinate of the second object OBJ2, to the gain value applicator 171c. The second gain values G2 may include 2A, 2B, 2C and 2D gain values, which are to be applied to the first, second, third and fourth sound data SD1, SD2, SD3 and SD4, respectively.

The gain value applicator 171c applies the first gain values G1 and the second gain values G2 to the first, second, third and fourth sound data SD1, SD2, SD3 and SD4. In one embodiment, for example, the gain value applicator 171c may apply the averages of the first gain values G1 and the second gain values G2 to the first, second, third and fourth sound data SD1, SD2, SD3, and SD4. In such an embodiment, the gain value applicator 171c may apply the average of a 1A gain value and the 2A gain value to the first sound data SD1, the average of a 1B gain value and the 2B gain value to the second sound data SD2, the average of a 1C gain value and the 2C gain value to the third sound data SD3, and the average of a 1D gain value and the 2D gain value to the fourth sound data SD4. The gain value applicator 171c may output first, second, third, and fourth sound data GSD1, GSD2, GSD3, and GSD4 obtained using both the first gain values G1 and the second gain values G2 to the sound driving unit 174.

Figure 17:
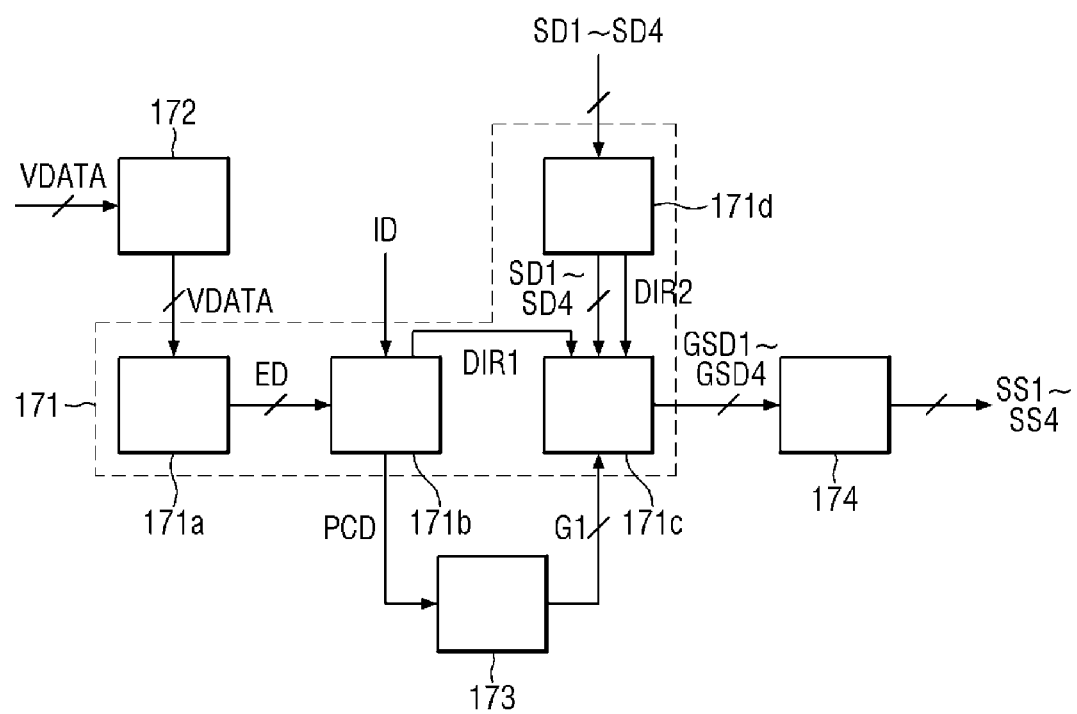
FIG. 17 is a block diagram illustrating an alternative exemplary embodiment of the image-sound matching unit of FIG. 9.
Figure 18:
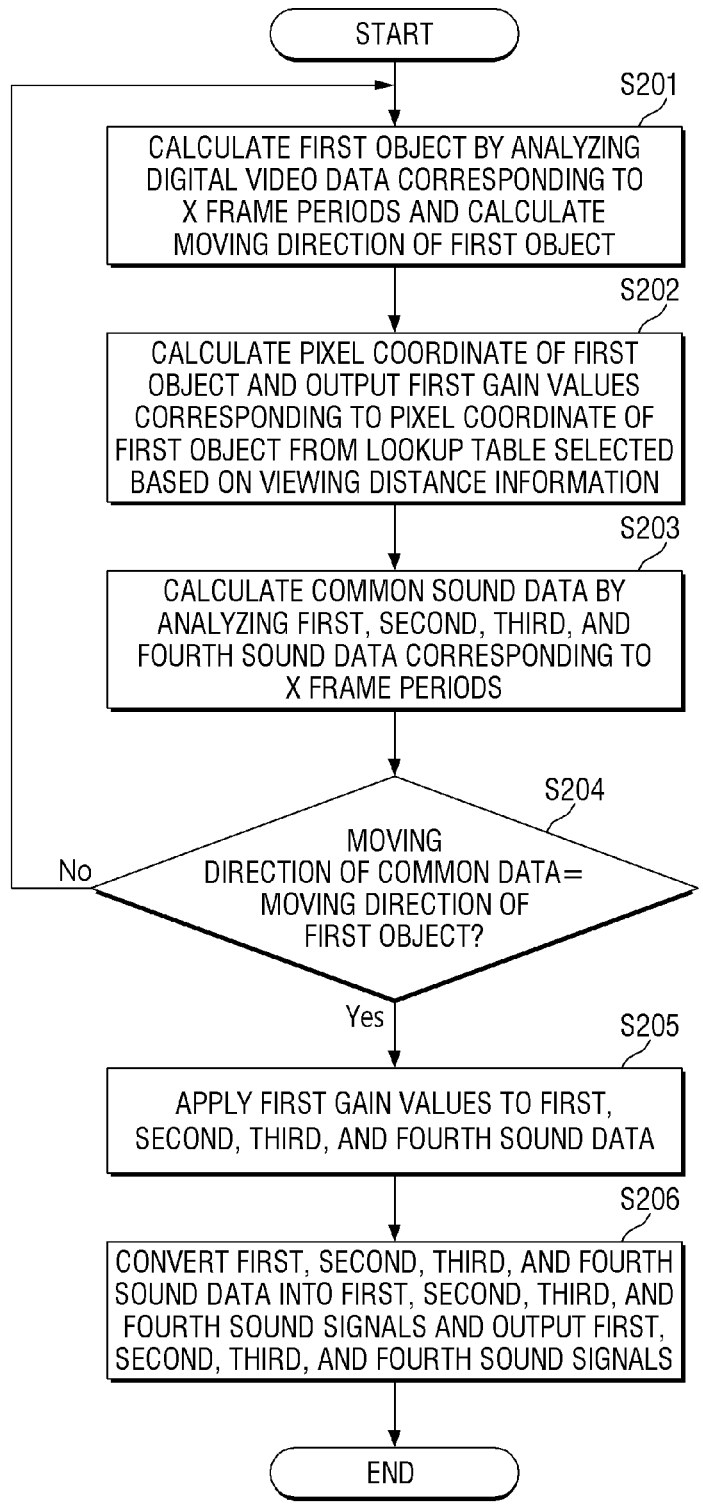
FIG. 18 is a flowchart illustrating a method of providing sound that matches a displayed image according to another embodiment of the disclosure.

FIG. 17 is a block diagram illustrating an alternative exemplary embodiment of the image-sound matching unit of FIG. 9. FIG. 18 is a flowchart illustrating a method of providing sound that matches a displayed image according to an alternative embodiment of the disclosure.

The embodiment of FIGS. 17 and 18 is substantially the same as the embodiment of FIGS. 12 and 14 except that an image-sound matching unit 171 further includes a sound pattern calculator 171d, and that a gain value applicator 171c determines whether the moving direction of a sound pattern that first, second, third, and fourth sound data have in common is identical to the moving direction of an object in a displayed image. The same or like elements shown in FIGS. 17 and 18 have been labeled with the same reference characters as used above to describe the embodiment of FIGS. 12 and 14, and any repetitive detailed description thereof will hereinafter be omitted or simplified.

Referring to FIG. 17, an embodiment of an image-sound matching unit 171 may include an object calculator 171a, a pixel coordinate calculator 171b, the gain value applicator 171c, and the sound pattern calculator 171d.

The object calculator 171a is substantially the same as that described above with reference to FIG. 12, and any repetitive detailed description thereof will be omitted. The processes 5202 through 5206 of FIG. 18 are substantially the same those described above with reference to FIG. 14, and any repetitive detailed descriptions thereof will be omitted.

The pixel coordinate calculator 171b calculates the moving direction of a first object OBJ by analyzing the pixel coordinate of the first object OBJ in each of X frame periods (S201).

In an embodiment, referring to FIGS. 15A and 15B, the pixel coordinate calculator 171b calculates the differences between the pixel coordinate of the first object OBJ in the a-th frame period and the pixel coordinate of the first object OBJ in the b-th frame period, i.e., (x2−x1, y2−y1). The pixel coordinate calculator 171b may determine the moving direction of the first object OBJ between the a-th frame period and the b-th frame period based on whether the difference between the x coordinate of the first object OBJ in the a-th frame period and the x coordinate of the first object OBJ in the b-th frame period, i.e., (x2−x1), and the difference between the y coordinate of the first object OBJ in the A-th frame period and the y coordinate of the first object OBJ in the b-th frame period, i.e., (y2−y1), are zero, positive or negative, as shown in Table 1 below. Referring to Table 1 below, one of nine directions may be defined as the moving direction of the first object OBJ. The pixel coordinate calculator 171b outputs first moving direction data DIR1 including moving direction information of the first object OBJ over the X frame periods to the gain value applicator 171c.

TABLE 1

| Difference between x coordinates (x2 − x1) | Difference between y coordinates (y2 − y1) | Moving direction |
| --- | --- | --- |
| Positive value | 0 | First direction (→) |
| Positive value | Positive value | Second direction (↗) |
| Positive value | Negative value | Third direction (↘) |
| Negative value | 0 | Fourth direction (←) |
| Negative value | Positive value | Fifth direction (↖) |
| Negative value | Negative value | Sixth direction (↙) |
| 0 | 0 | No directions |
| 0 | Positive value | Seventh direction (↑) |
| 0 | Negative value | Eighth direction (↓) |

The sound pattern calculator 171d calculates common sound data, which at least two of first, second, third and fourth sound data SD1, SD2, SD3 and SD4 corresponding to the X frame periods have in common, by analyzing the first, second, third and fourth sound data SD1, SD2, SD3 and SD4 (S203).

The sound pattern calculator 171d calculates the moving direction of the common sound data. In one embodiment, for example, when the common sound data is included in the first and second sound data SD1 and SD2, the sound pattern calculator 171d may determine in which the common sound data of the first and second sound data SD1 and SD2 appears earlier than in the other sound data. In such an embodiment, when the common sound data of the first and second sound data SD1 and SD2 appears earlier in the first sound data SD1 than in the second sound data SD2, sound may be determined as being output while moving from the first sound generating device 210 to the second sound generating device 220. That is, the sound pattern calculator 171d may determine the moving direction of the common sound data based on in which the common sound data of the first, second, third and fourth sound data SD1, SD2, SD3 and SD4 appears earlier than in the other sound data, as shown in Table 2 below. The sound pattern calculator 171d may output second moving direction data DIR2 including moving direction information of the common sound data over the X frame periods to the gain value applicator 171c.

TABLE 2

| Prior | Posterior | Moving direction |
| --- | --- | --- |
| First sound data | Second sound data | First direction (→) |
| Third sound data | Second sound data | Second direction (↗) |
| First sound data | Fourth sound data | Third direction (↘) |
| Second sound data | First sound data | Fourth direction (←) |
| Fourth sound data | First sound data | Fifth direction (↖) |
| Second sound data | Third sound data | Sixth direction (↙) |
| First sound data | First sound data | No directions |
| Second sound data | Second sound data | No directions |
| Third sound data | Third sound data | No directions |
| Fourth sound data | Fourth sound data | No directions |
| Third sound data | First sound data | Seventh direction (↑) |
| Fourth sound data | Second sound data | Seventh direction (↑) |
| First sound data | Third sound data | Eighth direction (↓) |
| Second sound data | Fourth sound data | Eighth direction (↓) |

In an embodiment, when the first and second moving direction data DIR1 and DIR2 are the same as each other, the gain value applicator 171c may determine that the moving direction of the first object OBJ and the moving direction of the common sound data are the same as each other. Thus, the gain value applicator 171c may determine that the common sound data is sound data of the first object OBJ for providing realistic sound that matches the displayed image. Thus, the gain value applicator 171c applies first gain values G1 to the first, second, third and fourth sound data SD1, SD2, SD3 and SD4 (S204 and S205).

According to an embodiment of FIGS. 17 and 18, when the moving direction of the common sound data, which is calculated by analyzing the first, second, third and fourth sound data SD1, SD2, SD3 and SD4, is the same as the moving direction of the first object OBJ, the common sound data may be determined as being the sound data of the first object OBJ. Thus, the first, second, third and fourth sound generated by the first, second, third and fourth sound generating devices 210, 220, 230 and 240 may be adjusted based on a change in the location of the first object OBJ by applying the first gain values G1, which are calculated and output based on the pixel coordinate of the first object OBJ, to the first, second, third and fourth sound data SD1, SD2, SD3 and SD4. Accordingly, sound generated by each sound generating device may be controlled based on the distance between the first object OBJ and each sound generating device, such that the user may feel as if sound were output from the first object OBJ. Therefore, the user may be provided with realistic sound that matches the displayed image.

Figure 19:
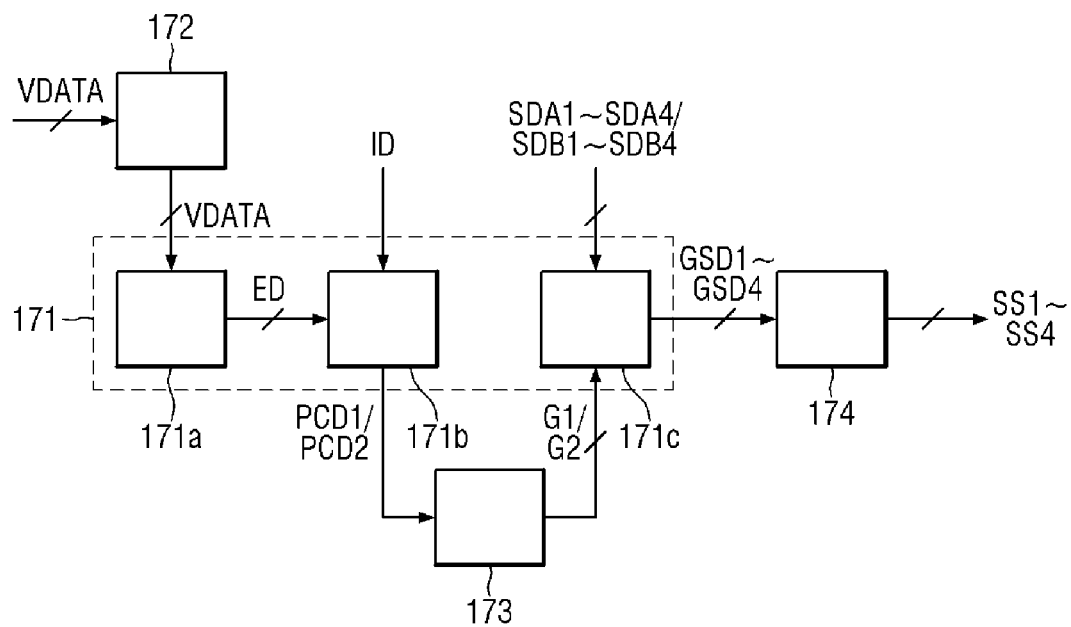
FIG. 19 is a block diagram illustrating another alternative exemplary embodiment of the image-sound matching unit of FIG. 9.
Figure 20:
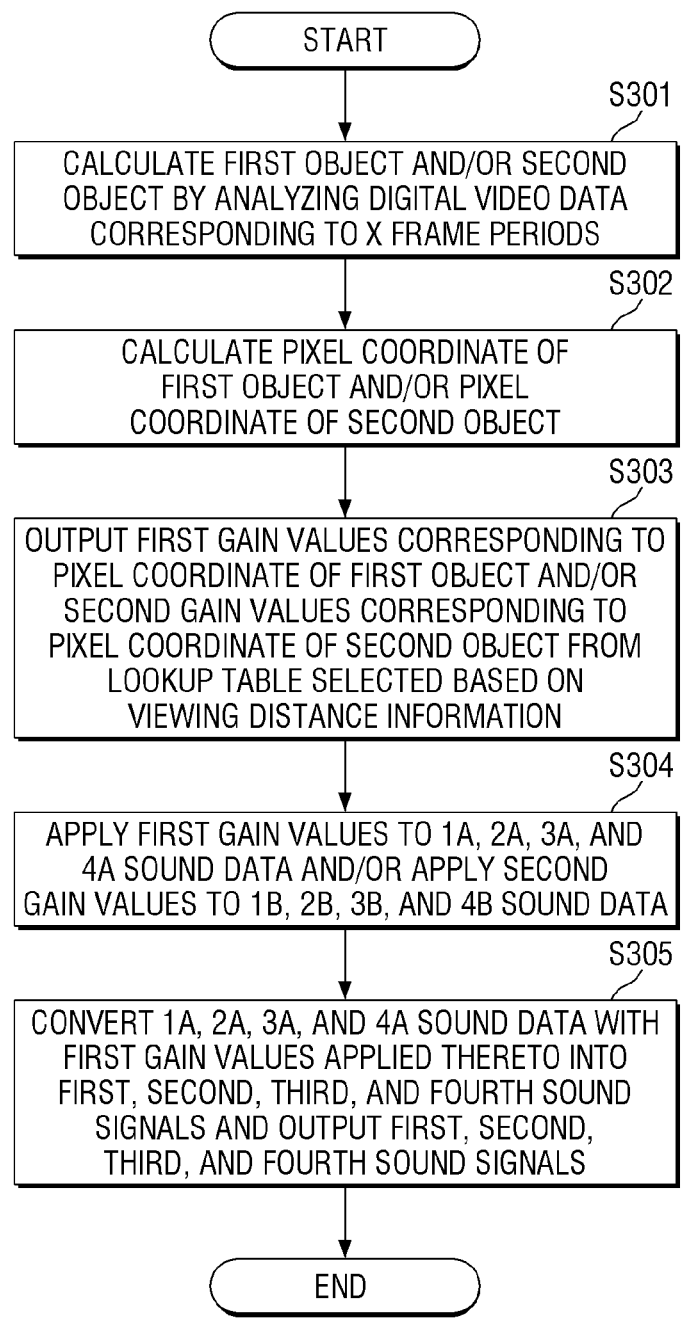
FIG. 20 is a flowchart illustrating a method of providing sound that matches a displayed image according to an alternative embodiment of the disclosure.
Figure 21A:
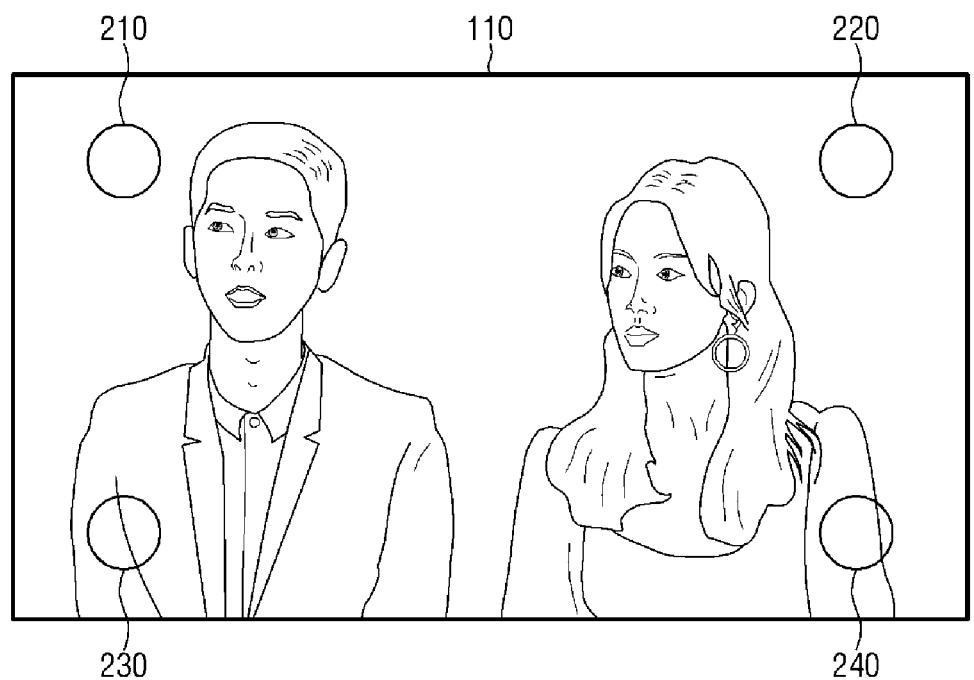
FIGS. 21A through 21C are schematic views illustrating cases where first and second objects are both displayed by a display panel, only the first object is displayed by the display panel, and only the second object is displayed by the display panel.
Figure 21B:
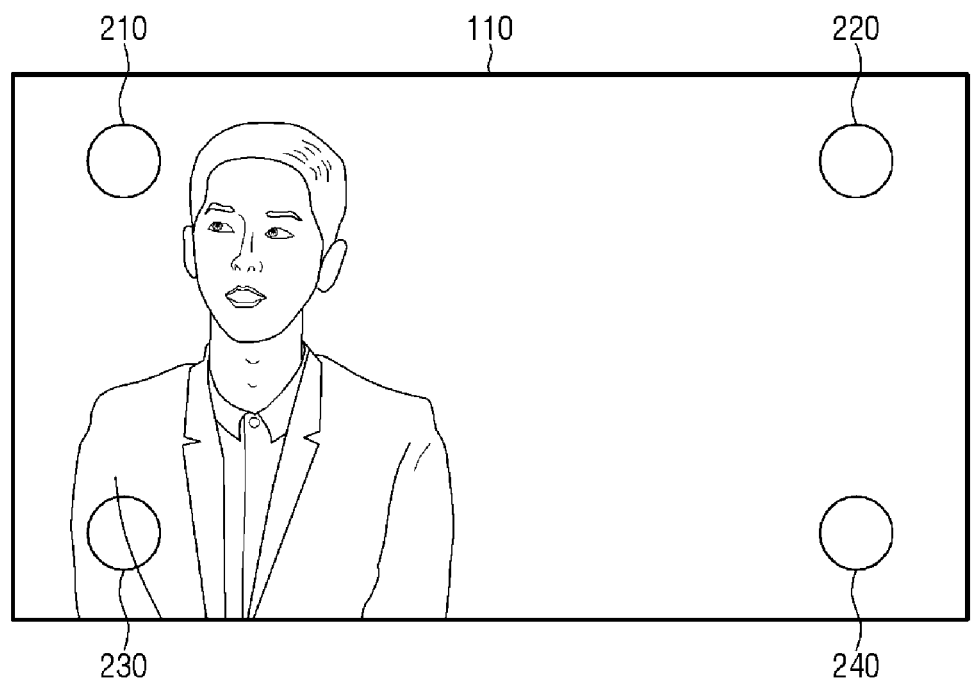
Figure 21C:
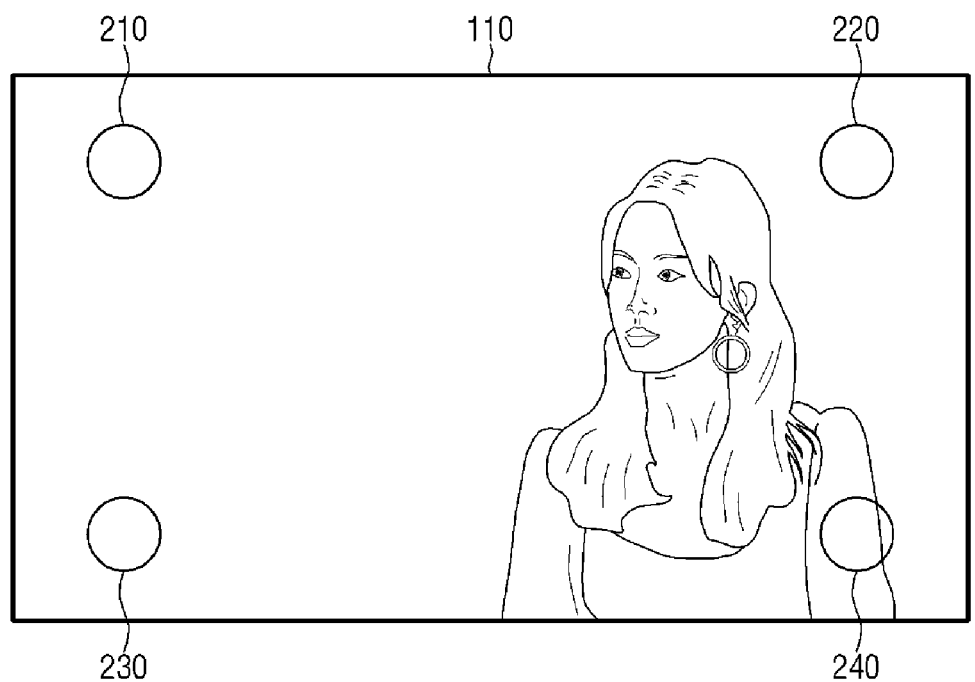

FIG. 19 is a block diagram illustrating another alternative exemplary embodiment of the image-sound matching unit of FIG. 9. FIG. 20 is a flowchart illustrating a method of providing sound that matches a displayed image according to another alternative embodiment of the disclosure. FIGS. 21A through 21C are schematic views illustrating cases where first and second objects are both displayed by a display panel, only the first object is displayed by the display panel, and only the second object is displayed by the display panel.

The embodiment of FIGS. 19, 20 and 21A through 21C is the same as the embodiment of FIGS. 12 and 14 except that an image-sound matching unit 171 receives 1A, 2A, 3A and 4A sound data SDA1, SDA2, SDA3 and SDA4 corresponding to a first object OBJ1, and 1B, 2B, 3B and 4B sound data SDB1, SDB2, SDB3 and SDB4 corresponding to a second object OBJ2.

The same or like elements shown in FIGS. 19, 20 and 21A through 21C have been labeled with the same reference characters as used above to describe the embodiment of FIGS. 12 and 14, and any repetitive detailed description thereof will hereinafter be omitted or simplified.

Referring to FIG. 19, in an embodiment, an object calculator 171*a* calculates not only the pixel coordinate of the first object OBJ1, but also the pixel coordinate of the second object OBJ2, by analyzing digital video data VDATA corresponding to X frame periods (S301 and S302).

In an embodiment, a displayed image corresponding to the digital video data may include both the first and second objects OBJ1 and OBJ2, as illustrated in FIG. 21A. When the displayed image corresponding to the digital video data includes both the first and second objects OBJ1 and OBJ2, a gain value applicator 171*c* may receive both the 1A, 2A, 3A and 4A sound data SDA1, SDA2, SDA3 and SDA4 corresponding to the first object OBJ1 and the 1B, 2B, 3B and 4B sound data SDB1, SDB2, SDB3 and SDB4 corresponding to the second object OBJ2 from the system-on-chip 175.

In such an embodiment, the displayed image corresponding to the digital video data VDATA may include only the first object OBJ1, as illustrated in FIG. 21B. when the displayed image corresponding to the digital video data VDATA includes only the first object OBJ1, the gain value applicator 171*c* may receive only the 1A, 2A, 3A and 4A sound data SDA1, SDA2, SDA3 and SDA4 corresponding to the first object OBJ1 from the system-on-chip 175.

In such an embodiment, the displayed image corresponding to the digital video data VDATA may include only the second object OBJ2, as illustrated in FIG. 21C. When the displayed image corresponding to the digital video data VDATA includes only the second object OBJ2, the gain value applicator 171*c* may receive only the 1B, 2B, 3B and 4B sound data SDB1, SDB2, SDB3 and SDB4 corresponding to the second object OBJ2 from the system-on-chip 175.

A pixel coordinate calculator 171*b* may output not only pixel coordinate data PCD1 including pixel coordinate information of the first object OBJ1, but also pixel coordinate data PCD2 including pixel coordinate information of the second object OBJ2, to one of the lookup tables 173 that is selected. In this case, the selected lookup table 173 may output not only first gain values G1 corresponding to the pixel coordinate of the first object OBJ1, but also second gain values G2 corresponding to the pixel coordinate of the second object OBJ2, to the gain value applicator 171*c* (S303). The second gain values G2 may include 2A, 2B, 2C and 2D gain values, which are to be applied to the 1B, 2B, 3B and 4B sound data SDB1, SDB2, SDB3 and SDB4, respectively.

The gain value applicator 171*c* receives the 1A, 2A, 3A and 4A sound data SDA1, SDA2, SDA3 and SDA4, which are sound data corresponding to the first object OBJ1, and the 1B, 2B, 3B and 4B sound data SDB1, SDB2, SDB3 and SDB4, which are sound data corresponding to the second object OBJ2, from the system-on-chip 175. The 1A, 2A, 3A and 4A sound data SDA1, SDA2, SDA3 and SDA4 may include not only sound data, but also metadata indicating that the 1A, 2A, 3A and 4A sound data SDA1, SDA2, SDA3 and SDA4 are sound data corresponding to the first object OBJ1. The 1B, 2B, 3B and 4B sound data SDB1, SDB2, SDB3 and SDB4 may include not only sound data, but also metadata indicating that the 1B, 2B, 3B and 4B sound data SDB1, SDB2, SDB3, and SDB4 are sound data corresponding to the second object OBJ2. Accordingly, the gain value applicator 171*c* may apply the first gain values G1 to the 1A, 2A, 3A and 4A sound data SDA1, SDA2, SDA3 and SDA4 and the second gain values G2 to the 1B, 2B, 3B and 4B sound data SDB1, SDB2, SDB3 and SDB4.

In such an embodiment, the gain value applicator 171*c* may apply 1A, 1B, 1C and 1D gain values to the 1A, 2A, 3A and 4A sound data SDA1, SDA2, SDA3 and SDA4, respectively, and the 2A, 2B, 2C and 2D gain values to the 1B, 2B, 3B and 4B sound data SDB1, SDB2, SDB3 and SDB4, respectively (S304).

The process 5305 of FIG. 20 is substantially the same as that described above with reference to FIG. 14, and any repetitive detailed description thereof will be omitted.

According to an embodiment of FIGS. 19 and 20, the image-sound matching unit 171 receives the 1A, 2A, 3A and 4A sound data SDA1, SDA2, SDA3 and SDA4, which are sound data corresponding to the first object OBJ1, and the 1B, 2B, 3B and 4B sound data SDB1, SDB2, SDB3 and SDB4, which are sound data corresponding to the second object OBJ2, may apply the first gain values G1, which are calculated based on the pixel coordinate of the first object OBJ1, to the 1A, 2A, 3A and 4A sound data SDA1, SDA2, SDA3 and SDA4 and the second gain values G2, which are calculated and output based on the pixel coordinate of the second object OBJ2, to the 1B, 2B, 3B and 4B sound data SDB1, SDB2, SDB3 and SDB4. Accordingly, sound corresponding to the first object OBJ1 and sound corresponding to the second object OBJ2 may both be provided in connection with the displayed image. Therefore, the user may be provided with realistic sound that matches the displayed image.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to exemplary embodiments thereof, it will be understood by those of ordinary skill in the art that various changes in form and details may be made therein without departing from the spirit or scope of the invention as defined by the following claims.

What is claimed is:

1. A method of providing a plurality of sounds matching an image displayed on a display panel, the method comprising:
    calculating a first object in the image by analyzing digital video data corresponding to the image, and calculating first gain values based on a location of the first object, and applying the first gain values to a plurality of sound data;
    displaying the image on the display panel based on the digital video data; and
    outputting the plurality of sounds by vibrating the display panel based on the plurality of sound data to which the first gain values applied, using a plurality of sound generating devices.

2. The method of claim 1, wherein the calculating the first object and the applying the first gain values, comprises:
    calculating the first object by analyzing digital video data corresponding to X frame periods, wherein X is an integer of 2 or greater;
    calculating a pixel coordinate of the first object, which represent the location of the first object, and outputting the first gain values corresponding to the pixel coordinate of the first object from a lookup table;

applying the first gain values to the plurality of sound data; and converting the plurality of sound data with the first gain values applied thereto into a plurality of sound signals, and outputting the plurality of sound signals to the plurality of sound generating devices, respectively.

3. The method of claim 2, wherein a pixel coordinate of the first object during an a-th frame period, which is among the X frame periods, differ from a pixel coordinate of the first object during a b-th frame period, which is among the X frame periods, wherein a is an integer satisfying the following inequality: 1≤a≤X−1, and wherein b is an integer satisfying the following inequality: a≤b≤X.

4. The method of claim 3, wherein the applying the first gain values to the plurality of sound data, comprises applying 1A and 1B gain values, which are among the first gain values, to first and second sound data, respectively, which are among the plurality of sound data.

5. The method of claim 4, wherein the converting the plurality of sound data with the first gain values applied thereto into the plurality of sound signals and the outputting the plurality of sound signals, comprises converting the first sound data with the 1A gain value applied thereto and the second sound data with the 1B gain value applied thereto into first and second sound signals, respectively, and outputting the first and second sound signals to first and second sound generating devices, which are among the plurality of sound generating devices.

6. The method of claim 5, wherein when the first object is disposed closest to the first sound generating device during the a-th frame period, the 1A gain value is greater than the 1B gain value.

7. The method of claim 5, wherein when the first object is disposed closest to the second sound generating device during the b-th frame period, the 1B gain value is greater than the 1A gain value.

8. The method of claim 5, wherein the calculating the pixel coordinate of the first object and the outputting the first gain values, comprises calculating the coordinate of a pixel at a center of the first object or the coordinate of a pixel on a first side of the first object as the pixel coordinate of the first object.

9. The method of claim 2, wherein the calculating the first object and the applying the first gain values, further comprises: capturing an image of a background at a front of the display panel and calculating a viewing distance of a user at the front of the display panel by analyzing the captured image; and selecting one of a plurality of lookup tables based on the viewing distance of the user.

10. The method of claim 9, wherein the selecting the one of the plurality of lookup tables, comprises selecting a first lookup table from among the plurality of lookup tables when the viewing distance of the user is a first viewing distance and selecting a second lookup table from among the plurality of lookup tables when the viewing distance of the user is a second viewing distance, and first gain values output from the first lookup table and corresponding to the pixel coordinate of the first object differ from first gain values output from the second lookup table and corresponding to the pixel coordinate of the first object.

11. The method of claim 2, wherein the calculating the pixel coordinate of the first object and the outputting the first gain values, comprises calculating a moving direction of the first object over the X frame periods.

12. The method of claim 11, wherein the applying the first gain values to the plurality of sound data, comprises:

calculating common sound data by analyzing the plurality of sound data and calculating a moving direction of the common sound data; and when the moving direction of the first object is the same as the moving direction of the common sound data, applying the first gain values to the plurality of sound data.

13. The method of claim 1, wherein the calculating the first object and the applying the first gain values, comprises:

calculating the first object and a second object by analyzing digital video data corresponding to X frame periods, wherein X is an integer of 2 or greater;

calculating a pixel coordinate of the first object, which represent the location of the first object, and a pixel coordinate of the second object, which represent a location of the second object, and outputting first gain values corresponding to the pixel coordinate of the first object and second gain values corresponding to the pixel coordinate of the second object from a lookup table;

applying the first gain values and the second gain values to the plurality of sound data; and converting the plurality of sound data with the first gain values and the second gain values applied thereto into a plurality of sound signals and outputting the plurality of sound signals to the plurality of sound generating devices, respectively.

14. The method of claim 13, wherein the applying the first gain values and the second gain values to the plurality of sound data, comprises applying an average of a 1A gain value, which is among the first gain values, and a 2A gain value, which is among the second gain values, to first sound data, which is among the plurality of sound data, and applying an average of a 1B gain value, which is among the first gain values, and a 2B gain value, which is among the second gain values, to second sound data, which is among the plurality of sound data.

15. The method of claim 1, wherein the calculating the first object and the applying the first gain values, comprises:

calculating the first object and a second object by analyzing the digital video data;

applying the first gain values to A sound data corresponding to the first object; and applying second gain values, which are calculated based on a location of the second object, to B sound data corresponding to the second object.

16. The method of claim 15, wherein the calculating the first object and the applying the first gain values, further comprises:

calculating the first and second objects by analyzing digital video data corresponding to X frame periods, wherein X is an integer of 2 or greater;

calculating a pixel coordinate of the first object, which represent the location of the first object, and a pixel coordinate of the second object, which represent the location of the second object, and outputting first gain values corresponding to the pixel coordinate of the first object and second gain values corresponding to the pixel coordinate of the second object from a lookup table;

applying the first gain values and the second gain values to the A and B sound data, respectively, which are among the plurality of sound data; and converting the A sound data with the first gain values applied thereto and the B sound data with the second gain values applied thereto into a plurality of sound signals and outputting the plurality of sound signals to the plurality of sound generating devices, respectively.

17. The method of claim 16, wherein the applying the first gain values and the second gain values to the A and B sound data, respectively, comprises applying 1A and 1B gain values, which are among the first gain values, to 1A and 2A sound data, respectively, which are among the A sound data, and applying 2A and 2B gain values, which are among the second gain values, to 1B and 2B sound data, respectively, which are among the B sound data.

18. A display device comprising:
a display panel including first and second substrates;
a plurality of sound generating devices disposed on a first surface of the first substrate, wherein the plurality of sound generating devices vibrates the display panel to output a sound;
a data driving unit which generates data voltages based on digital video data corresponding to an image to be displayed on the display panel and outputs the data voltages to data lines of the display panel;
an image-sound matching unit which calculates a first object in the image by analyzing the digital video data, and applies first gain values, which are calculated based on a location of the first object, to a plurality of sound data; and
a sound driving unit which converts the plurality of sound data into a plurality of sound signals and outputs the plurality of sound signals to the plurality of sound generating devices, respectively.

19. The display device of claim 18, further comprising:
a memory which stores digital video data corresponding to X frame periods, wherein X is an integer of 2 or greater,
wherein the image-sound matching unit calculates the first object by analyzing the digital video data stored in the memory, and calculates a pixel coordinate of the first object, which represent the location of the first object.

20. The display device of claim 19, further comprising:
a lookup table which stores gain values corresponding to each pair of a pixel coordinate at the display panel, wherein
the image-sound matching unit outputs the pixel coordinate of the first object to the lookup table, and
the lookup table outputs first gain values corresponding to the pixel coordinate of the first object.

21. The display device of claim 20, wherein
the image-sound matching unit calculates a second object by analyzing the digital video data stored in the memory, calculates a pixel coordinate of the second object, which represent a location of the second object, and outputs the pixel coordinate of the second object to the lookup table, and
the lookup table outputs second gain values corresponding to the pixel coordinate of the second object.

22. The display device of claim 21, wherein the image-sound matching unit applies the first gain values and the second gain values to the plurality of sound data.

23. The display device of claim 19, further comprising:
a camera device which captures an image of a background at a front of the display panel; and
a viewing distance calculation unit which calculates a viewing distance of a user at the front of the display panel by analyzing the captured image.

24. The display device of claim 23, further comprising:
a first lookup table which stores gain values corresponding to each pair of a pixel coordinate at the display panel for a case where the viewing distance of the user is a first viewing distance; and
a second lookup table which stores gain values corresponding to each pair of the pixel coordinate at the display panel for a case where the viewing distance of the user is a second viewing distance.

25. The display device of claim 24, wherein
when the viewing distance of the user is the first viewing distance, the image-sound matching unit outputs the pixel coordinate of the first object to the first lookup table, and the first lookup table outputs first gain values corresponding to the pixel coordinate of the first object,
when the viewing distance of the user is the second viewing distance, the image-sound matching unit outputs the pixel coordinate of the first object to the second lookup table, and the second lookup table outputs first gain values corresponding to the pixel coordinate of the first object, and
the first gain values output by the first lookup table differ from the first gain values output by the second lookup table.

26. The display device of claim 18, wherein
the image-sound matching unit calculates the first object and a second object by analyzing the digital video data, applies the first gain values to A sound data among the plurality of sound data and corresponding to the first object, and applies second gain values, which are calculated based on a location of the second object, to B sound data the plurality of sound data and corresponding to the second object.

* * * * *